US012574807B2

(12) United States Patent
Ji et al.

(10) Patent No.: US 12,574,807 B2
(45) Date of Patent: Mar. 10, 2026

(54) CONFIGURING OF RELAY UE CONTEXT INFORMATION

(71) Applicant: Nokia Technologies OY, Espoo (FI)

(72) Inventors: Lianghai Ji, Aalborg (DK); Ling Yu, Kauniainen (FI); Vinh Van Phan, Oulu (FI); Faranaz Sabouri-Sichani, Aalborg (DK); Rudraksh Shrivastava, Erligheim (DE); Sudeep Hegde, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 401 days.

(21) Appl. No.: 18/041,299

(22) PCT Filed: Jul. 22, 2021

(86) PCT No.: PCT/EP2021/070546
§ 371 (c)(1),
(2) Date: Feb. 10, 2023

(87) PCT Pub. No.: WO2022/033833
PCT Pub. Date: Feb. 17, 2022

(65) Prior Publication Data
US 2024/0031877 A1 Jan. 25, 2024

(30) Foreign Application Priority Data
Aug. 14, 2020 (EP) .................................... 20191035

(51) Int. Cl.
*H04W 36/00* (2009.01)
*H04W 88/04* (2009.01)

(52) U.S. Cl.
CPC ........ *H04W 36/0033* (2013.01); *H04W 88/04* (2013.01)

(58) Field of Classification Search
CPC ... H04W 88/04; H04W 36/033; H04W 92/18; H04W 36/0033; H04W 36/03
See application file for complete search history.

(56) References Cited

U.S. PATENT DOCUMENTS

| | | | |
|---|---|---|---|
| 10,439,682 B2 | 10/2019 | Tseng et al. | |
| 2017/0086114 A1 | 3/2017 | Jung et al. | |
| 2018/0035354 A1 | 2/2018 | Martin et al. | |
| 2018/0152986 A1* | 5/2018 | Jung .................... | H04W 76/27 |

(Continued)

FOREIGN PATENT DOCUMENTS

| | | |
|---|---|---|
| CN | 103404222 A | 11/2013 |
| CN | 107710862 A | 2/2018 |

(Continued)

OTHER PUBLICATIONS

Huawei et al: "Service Continuity fo L2 UE-to-Network Relay", vol. RAN WG2, Aug. 7, 2020.

(Continued)

*Primary Examiner* — Allahyar Kasraian
(74) *Attorney, Agent, or Firm* — Barta Jones, PLLC

(57) ABSTRACT

In one embodiment, the method includes obtaining virtual relay context information enabling by one or more relay mobile device candidates to relay traffic; and applying the virtual relay context information to be configured as a respective relay mobile device of the one or more relay mobile device candidates for relaying traffic.

8 Claims, 11 Drawing Sheets

(56)　　　　　References Cited

U.S. PATENT DOCUMENTS

| | | | |
|---|---|---|---|
| 2019/0200288 | A1 | 6/2019 | Folke et al. |
| 2019/0380159 | A1 | 12/2019 | Bangolae et al. |
| 2020/0128447 | A1 | 4/2020 | Ying |
| 2021/0289580 | A1* | 9/2021 | Damnjanovic ....... H04W 24/02 |
| 2023/0053351 | A1* | 2/2023 | Cheng ................... H04W 8/005 |
| 2023/0189102 | A1* | 6/2023 | Xu ........................ H04W 40/36 |
| | | | 370/315 |

FOREIGN PATENT DOCUMENTS

| | | |
|---|---|---|
| CN | 107852591 A | 3/2018 |
| CN | 111526544 A | 8/2020 |
| WO | WO-2016/193864 A1 | 12/2016 |
| WO | WO-2018/083055 A1 | 5/2018 |

OTHER PUBLICATIONS

VIVO: "Protocol Stack and Service Continuity for L2 and L3 Relay", vol. RAN WG2, Aug. 7, 2020.

International Search Report for International Application No. PCT/EP2021/070546 dated Nov. 2, 2021.

"3rd Generation Partnership Project; Technical Specification Group Radio Access Network; Study on further enhancements to LTE Device to Device (D2D), User Equipment (UE) to network relays for Internet of Things (IoT) and wearables; (Release 15)", 3GPP TR 36.746 V15.1.1, Apr. 2018, pp. 1-55.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.0.0, Mar. 2020, pp. 1-1048.

"3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.

"3rd Generation Partnership Project; Technical Specification Group Radio Access Network; NR; Requirements for support of radio resource management (Release 16)", 3GPP TS 38.133 V16.3.0, Mar. 2020, pp. 1-1169.

"Discussion on L2 U2N relay service continuity issues for inter-gNB path switch", 3GPP TSG-RAN WG2 Meeting #122, R2-2305420, Nokia, 7.9.3, May 22-26, 2023, 7 pages.

Griffith, "Service Continuity Using UE-to-Network Relays", 2nd Workshop on 5G Technologies for Tactical and First Responder Networks, Oct. 7, 2019, 21 pages.

Extended European Search Report received for corresponding European Patent Application No. 20191035.3, dated Jan. 13, 2021, 11 pages.

Office action received for corresponding European Patent Application No. 20191035.3, dated Dec. 2, 2024, 5 pages.

Office action received for corresponding Chinese Patent Application No. 202180055360.X, dated Dec. 12, 2024, 9 pages of office action and no page of translation available.

* cited by examiner

300

| Obtaining discovery information | 301 |

| Configuring virtual relay context information | 302 |

| Providing the virtual relay context information | 303 |

| Communicating with the at least one remote mobile device via the relay mobile device | 304 |

| Configuring a hand over | 305 |

CONFIGURING OF RELAY UE CONTEXT INFORMATION

CROSS-REFERENCE TO RELATED APPLICATIONS

This application is a national phase under 35 U.S.C. § 371 of PCT International Application No. PCT/EP2021/070546 which has an International filing date of Jul. 22, 2021, which claims priority to European Application No. 20191035.3, filed Aug. 14, 2020, the entire contents of each of which are hereby incorporated by reference.

FIELD

The following disclosure relates to the field of mobile communication networks, or more particularly relates to systems, apparatuses, and methods for configuring relay UE (User Equipment) context information for a mobile device.

BACKGROUND

UE-to-Network (UE2NW) relay can be used to extend network coverage. When a UE with active Uu traffic, thus traffic via Uu interface, e.g. is entering or is about to enter a coverage hole, it may consider another qualified UE as the UE-to-Network relay to relay its traffic with the network. Such a relaying may be done via a layer-2 or layer-3 UE-to-Network relay.

A remote UE may experience a relatively bad radio condition with its serving BS (base station), or a remote UE may be even in a network coverage hole or out-of-coverage and, thus, the remote UE may search for any relay UE candidate(s) to assist its communication with network. There may be certain radio conditions for both Uu and PC5 interfaces to fulfil, before a UE can be considered as a relay UE candidate to serve and relay the traffic of the remote UE. If there are multiple relay candidates, a remote UE may select, e.g. the relay with the highest received SL-RSRP (Reference Signal Received Power) according to the current solution (see e.g. 3GPP TS (Technical Specification) 36.331). After the remote UE selects the relay, the relay UE can be configured by network to support the relay functionality, e.g. configuring the mapping between SL radio bearer(s) and Uu radio bearer(s), allocating resource for relay communication, etc. Afterwards, the relay UE may start to relay the traffic between the remote UE and the network, e.g. by using the configuration.

However, a Uu (interface) condition of the relay UE and/or a SL condition between the relay and the remote UEs may change rather dynamically due to the mobility (e.g. moving) of the relay and/or the remote UEs, which may cause a frequent change/reselection of the relay UE to serve the considered remote UE. For example, the remote UE may first be served by one relay UE, but later, this relay UE may become improper to continue as a relay UE, e.g. since its Uu or SL radio condition may get worse due to mobility. In this case, a relay re-selection may be beneficial to be performed, for example:

1. The relay UE may trigger a SL release procedure with the remote UE, with or without possible pre-warning of becoming unsuitable to serve as the relay for the remote UE.
2. Then, the remote UE needs to search for and select a new relay UE.

3. Network may configure the new relay UE with the information to support the relay functionality.

SUMMARY OF SOME EXEMPLARY EMBODIMENTS

However, between the triggering of the relay UE (step 1 above) and the network configuring the new relay UE (step 3 above), the remote UE may experience a service interruption. Moreover, additional signaling overhead may be needed for network to configure the new relay UE (e.g. step 3 above).

Further, the relay UE will release the sidelink to the remote UE, and afterwards, the remote UE needs to search for a new relay UE requiring the new relay UE to be configured by the network.

It is thus, inter alia, an object of example embodiments to achieve a solution to improve a service continuity in case of relay re-selection while keeping the signaling overhead low.

According to a first exemplary aspect, a method is disclosed, the method comprising:

> obtaining virtual relay context information enabling the apparatus to serve at least one remote mobile device as a relay mobile device to relay traffic between the at least one remote mobile device and a base station of a mobile communication network; and
> applying the virtual relay context information to be configured as the relay mobile device for the at least one remote mobile device in case at least one condition of one or more conditions is fulfilled and/or in case of an activation indication is obtained.

This method may for instance be performed and/or controlled by an apparatus, for instance a mobile device, e.g. a mobile terminal, UE, smartphone, tablet, IoT-device, wearable, or a combination thereof, to name but a few non-limiting examples. For instance, the method may be performed and/or controlled by using at least one processor of the mobile device. The mobile device may be an entity of the mobile communication network. The mobile device may be capable of multicarrier operation in the mobile communication network.

According to a second exemplary aspect, a method is disclosed, the method comprising:

> configuring virtual relay context information enabling one or more relay mobile device candidates to serve at least one remote mobile device as a relay mobile device to relay traffic between the at least one remote mobile device and the apparatus;
> providing the virtual relay context information to the one or more relay mobile device candidates prior to a respective relay mobile candidate is selected as a relay mobile device for the at least one remote mobile device.

This method may for instance be performed and/or controlled by an apparatus, for instance a radio access node, e.g. a base station, e.g. a gNB, an en-gNB or a ng-eNB. For instance, the method may be performed and/or controlled by using at least one processor of the radio access node and/or base station.

According to a third exemplary aspect, a method is disclosed, the method comprising:

> providing discovery information at least indicative of a presence of one or more relay mobile device candidates; and
> selecting a respective relay mobile device from the one or more relay mobile device candidates configured with virtual relay context information for relaying traffic for the apparatus; and utilizing the selected relay mobile device using the virtual relay context information for communicating with a base station of a mobile communication network.

This method may for instance be performed and/or controlled by an apparatus, for instance a mobile device, e.g. a mobile terminal, UE, smartphone, tablet, IoT-device, wearable, or a combination thereof, to name but a few non-limiting examples. For instance, the method may be performed and/or controlled by using at least one processor of the mobile device. The mobile device may be an entity of the mobile communication network. The mobile device may be capable of multicarrier operation in the mobile communication network.

According to a further exemplary aspect, a computer program is disclosed, the computer program when executed by a processor causing an apparatus, for instance a server, to perform and/or control the actions of the method according to the first, second and/or third exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to the first, second and/or third exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect, an apparatus is disclosed, comprising at least one processor and at least one memory including computer program code, the at least one memory and the computer program code configured to, with the at least one processor, cause an apparatus, for instance the apparatus, at least to perform and/or to control the method according to the first, second and/or third exemplary aspect.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

According to a further exemplary aspect, a system is disclosed, comprising:

at least one first apparatus according to the first exemplary aspect as disclosed above, at least one second apparatus according to the second exemplary aspect as disclosed above, and at least one third apparatus according to the third exemplary aspect as disclosed above.

In the following, exemplary features and exemplary embodiments of all aspects will be described in further detail.

A mobile communication network, as used herein, refers to a network that can be utilized by one or more mobile devices. Such a mobile communication network typically operates in accordance with a given standard or specification which may set out what the various entities (e.g. the one or more mobile devices, one or more base stations respectively radio access nodes (e.g. gNBs) associated with the mobile communication network are permitted to do and how that should be achieved. Communication protocols and/or parameters which shall be used for the connection are also typically defined. Examples of standardized radio access technologies comprise GSM (Global System for Mobile), EDGE (Enhanced Data for GSM Evolution), Radio Access Networks (GERAN), Universal Terrestrial Radio Access Networks (UTRAN), evolved UTRAN (E-UTRAN), fifth generation (5G) New Radio (NR), to name but a few non-limiting examples. An example of standardized communication system architecture is Long-term Evolution (LTE) of the Universal Mobile Telecommunications Systems (UMTS) Radio Access Technology. LTE is standardized by the $3^{rd}$ Generation Partnership Project (3GPP). The LTE employs E-UTRAN access. Further developments are referred to as LTE Advanced (LTE-A), 5G, or 5G+, and/or NR communication standard. The "network" as used herein, may for instance be said mobile communication network.

Such an apparatus (e.g. a mobile device) according to the first and/or to the third exemplary aspect, as used herein, may for instance be portable (e.g. weigh less than 1, 0.8, 0.6, 0.4, 0.2, 0.1 kg, or less), like a mobile phone, personal digital assistance device, computer, laptop computer, a UE, an IoT device, e.g. comprised by a vehicle, or a combination thereof as non-limiting examples. The apparatus may for instance comprise or be connectable to a display for displaying information. The apparatus may for instance comprise or be connectable to means for outputting sound, e.g. in the form of spoken commands or information. The apparatus may for instance comprise or be connectable to one or more sensors for determining the devices position, such as for instance a GNSS receiver, in the form of a GPS receiver. The apparatus may for instance comprise or be connectable to one or more sensors, e.g. in the form of an accelerometer and/or a gyroscope and/or magnetometer and/or barometer for gathering (e.g. measuring) further information, such as motion sensor data. The apparatus may for instance comprise or be connectable to a receiver and/or a transmitter (e.g. a transceiver) for receiving and/or sending information.

The apparatus according to the first exemplary aspect may for instance be a relay UE, e.g. which may enable a communication between an apparatus according to the third exemplary aspect (e.g. a remote UE) and a mobile communication network, e.g. an apparatus according to the second exemplary aspect (e.g. a base station of the mobile communication network).

The apparatus according to the third exemplary aspect may for instance be a remote mobile device (e.g. remote UE), e.g. which may experience a bad radio condition with a current serving base station (e.g. an apparatus according to the second exemplary aspect), e.g. network node, and/or may be out or moving out of coverage with the serving base station. Then, e.g. an apparatus according to the first exemplary aspect may act as a relay mobile device (e.g. relay UE) or relay mobile device candidate (e.g. relay UE candidate)

for one or more apparatuses according to the third exemplary aspect, e.g. in case the apparatus acting as a relay mobile device or relay mobile device candidate is within a coverage of a current serving base station, to name but one non-limiting example.

The apparatus according to the first exemplary aspect may obtain virtual relay context information, e.g. by receiving the virtual context relay information from a base station of the mobile communication network. The base station providing the virtual relay context information to the apparatus may for instance be an apparatus according to the second exemplary aspect. The relay context information may alternatively or additionally be obtained (e.g. received) from a remote mobile device which may have obtained the virtual relay context information earlier.

The virtual relay context information may enable one or more relay mobile device candidates to relay traffic. This may allow to prepare a plurality (e.g. at least two) of relay mobile device candidates to serve as a relay mobile device by means of the virtual relay context information. The relay mobile device candidates may be prepared to serve as a respective relay mobile device. Since the relay mobile device candidate is prepared in this way, it may apply the virtual relay context information to serve as a respective relay mobile device. Further, one or more other relay mobile devices are prepared in this way, the remote mobile device can switch between one or more relay mobile devices in a quick fashion. The virtual relay context information provided to the one or more relay mobile device candidates may be the same for the one or more relay mobile devices. This may allow to switch between the one or more relay mobile device candidates for relaying traffic of a respective remote mobile device.

The apparatus according to the first exemplary aspect may apply the virtual relay context information to be configured, or act, or serve as the relay mobile device for the at least one remote mobile device in case at least one condition of one or more conditions is fulfilled and/or in case of an activation indication is obtained.

The respective remote mobile device may select a respective relay mobile device eventually, e.g. based on at least one condition (e.g. relay measurement condition) being fulfilled. Also, the relay mobile device candidate may apply the virtual relay context information based on at least one condition being fulfilled by itself. The respective relay mobile device may be selected among a plurality (e.g. at least two) of relay mobile device candidates, which may be prepared in advance by the respective relay mobile device candidate obtaining the virtual relay context information. Further, a re-selection of a respective relay mobile device may be performed and/or controlled in the same way, since the plurality of relay mobile device candidates may be prepared to serve the remote mobile device as a relay mobile device accordingly. The remote mobile device may provide with an activation indication indicating that the apparatus according to the third exemplary aspect has selected it (the apparatus according to the first exemplary aspect) as its relay mobile device. Based, at least in part, on such an activation indication, the respective relay mobile device may apply the virtual relay context information (readily available in its memory) that enables a configuration for relaying traffic of the remote mobile device (e.g. apparatus according to the third exemplary aspect). Thus, the respective mobile device (s) being such relay mobile device candidates may obtain (e.g. receive) the virtual relay context information, e.g. prior to applying the virtual relay context information.

The selecting of the respective relay mobile device of the one or more relay mobile device candidates for relaying traffic of the apparatus according to the third exemplary aspect may be based, at least in part, on one or more conditions that are beneficial for enabling that the relay mobile device candidate(s) can act as a respective relay mobile device for the apparatus according to the third exemplary aspect. More details with regard to such one or more conditions are disclosed below.

In order to improve service continuity, the network (e.g. a base station; e.g. an apparatus according to the second exemplary aspect) may configure such a virtual relay UE context, e.g. by configuring the virtual relay context information. Such a virtual relay context information may be the same for the one or more relay mobile device candidates. Such a virtual relay context information may be configured for a respective remote mobile device, e.g. apparatus according to the third exemplary aspect. For instance, the virtual relay UE context (e.g. the virtual relay context information) may be or comprise, at least in part, C-RNTI (Cell-Radio Network Temporary Identifier), SPS (Semi-Persistent Scheduling)/CG (Configured Grant) configuration, the configurations for SRBs (Signaling Radio Bearer), DRBs (Data Radio Bearer), LCHs (Logical Channels), NAS (Non Access Stratum), RRC (Radio Resource Control), MAC (Medium Access Control) and PHY (Physical) layers, or a combination thereof, to name but a few non-limiting examples. The network may configure the virtual relay UE context (e.g. the virtual relay context information) to the potential relay mobile device (s), e.g. via the remote mobile device or directly to the respective relay mobile device candidate(s). The virtual relay UE context information may be used by any qualified relay UE selected by the remote UE to relay the traffic of the remote UE with network. This may be allowed since the same virtual relay context information may be provided to the one or more relay mobile device candidates, enabling to switch between the one or more relay mobile device candidates that then serve as a respective relay mobile device.

According to an exemplary embodiment of the first exemplary aspect, the virtual relay context information is obtained from the at least one remote mobile device and/or the mobile communication network.

According to an exemplary embodiment of the second exemplary aspect, the virtual relay context information is provided to the one or more relay mobile device candidates and/or to the at least one remote mobile device.

According to an exemplary embodiment of the third exemplary aspect, the virtual relay context information is obtained from the mobile communication network, and optionally relayed to the one or more relay mobile device candidates.

For instance, the configured virtual relay UE context (e.g. virtual relay context information) may be sent (e.g. provided) to the remote UE (apparatus according to the third exemplary aspect) by an apparatus according to the second exemplary aspect, wherein the remote UE in turn provides (e.g. sends) the virtual relay context information to (e.g. all) potential relay UE(s) (e.g. one or more relay mobile device candidates), e.g. over PC5 SL. Additionally or alternatively, the virtual relay context information may be provided by an apparatus according to the second exemplary aspect to at least one of the one or more relay mobile device candidates, which in turn may provide (e.g. sends) the virtual relay context information to (e.g. all) further relay mobile device candidate(s), e.g. via unicast, groupcast and/or broadcast, to name but a few non-limiting examples.

Such virtual relay UE context (e.g. virtual relay context information) may also be used by the apparatus according to the third exemplary aspect (e.g. remote mobile device) for its direct communication with the base station, provided that the virtual relay UE context is configured from the base station. For example, the base station may be the current serving base station if the remote UE comes back to the coverage of current serving base station. Or the base station may be another neighboring base station configuring the virtual relay UE context if the remote UE enters the coverage of that neighboring base station. In the latter example, the remote UE may further indicate to the base station that the remote UE is using the virtual relay UE context to communicate with the base station. Further, this may be based on a base station identifier indicative of the respective base station that provided the virtual relay context information. This in turn may trigger the network, e.g. base station of the network to configure a new actual virtual UE context (e.g. configuring new or updated virtual relay context information) for the apparatus (e.g. remote UE) with/without releasing the earlier virtual relay UE context (e.g. virtual relay context information).

The virtual relay context information may be obtained by the apparatus according to the first exemplary aspect and/or the apparatus according to the third exemplary aspect via a Uu interface. Such a Uu interface may be established between the respective apparatus and a base station, e.g. a serving base station of the apparatus, or another base station of the mobile communication network which provides the virtual relay context information to a relay mobile device which relays the virtual relay context information to the apparatus. In the latter case, such a Uu interface may be established between the serving base station of the respective relay mobile device.

The virtual relay context information that is obtained by the remote mobile device (e.g. apparatus according to the third exemplary aspect) may be a first set of virtual relay context information that is obtained from source base station. Then, in case of a hand over from the serving cell to a neighbor cell, another, thus, second set of virtual relay context information may be obtained (e.g. received) by the apparatus, wherein such a second set of virtual relay context information may stem (e.g. is sent by) the target base station serving the neighbor cell. This may allow the apparatus to select a respective relay mobile device candidate as its relay mobile device served by a different cell even prior to being served by that cell to which it is intended to be handed over, e.g. the neighbor cell.

The apparatus according to the second exemplary aspect may be a base station of the mobile communication network. The apparatus may serve at least one apparatus according to the first exemplary aspect. To enable a respective apparatus according to the third exemplary aspect improved service continuity, the apparatus (according to the second exemplary aspect) may configure virtual relay context information for the respective apparatus according to the first exemplary aspect. The virtual relay context information may enable the respective apparatus according to the first exemplary aspect to relay traffic for the apparatus according to the third exemplary aspect. The respective apparatus according to the first exemplary aspect may be selected by the apparatus according to the third exemplary aspect among one or more relay mobile device candidates, as disclosed above with regard to example embodiments of the first exemplary aspect. Further, a respective apparatus according to the first exemplary aspect may relay traffic for another apparatus according to the first exemplary aspect by using virtual relay context information configured for the first apparatus. Example embodiments of all exemplary aspects may enable to form a "relaying-chain" between one remote mobile device, one or more relay mobile devices and the mobile communication network, to name but one non-limiting example. In one further example embodiment, the virtual relay context information may be applied (e.g. only) by a relay mobile device with a direct connection with network in the "relaying-chain". Thus, a dynamic switch and selection may be allowed among the one or more relay mobile device(s) to serve the remote mobile device as the first-hop mobile relay device with a direct connection with network.

The virtual relay context information may be configured in such a way that the (e.g. same) virtual relay context information may be used by any relay mobile device candidate (e.g. that qualifies for relaying traffic with mobile communication network, e.g. based on the one or more conditions that are evaluated) to relay traffic with no or reduced signaling, e.g. between the respective relay mobile device and the apparatus which traffic is to be relayed beneficial to take place.

The configured virtual relay context information may further be provided, e.g. by sending the virtual relay context information to the apparatus (e.g. remote mobile device) which traffic is to be relayed. Alternatively or additionally, the virtual relay context information may be sent to the one or more relay mobile device candidates. This may be enabled e.g. since a discovery information may be obtained (e.g. received) from the apparatus which traffic is to be relayed.

For transmitting traffic between the apparatus according to the third exemplary aspect (e.g. remote mobile device) and a respective apparatus according to the first exemplary aspect (e.g. relay mobile device), a PC5 interface may be used. Such a PC5 interface may be also referred to as 3GPP PC5 (also known as LTE V2X/sidelink and/or NR sidelink) enabling a direct communication between two mobile devices (e.g. two apparatuses of the first and/or third exemplary aspect, e.g. a remote mobile device and a relay mobile device). The PC5 interface may enable communication according to standardized short-range technologies e.g. operating in the 5.9 GHz or further/other frequency band. The communication via such a PC5 interface may not require assistance from the mobile communication network.

This may allow that the apparatus according to the third exemplary aspect is served with one or more services of the mobile communication network, e.g. although it is located outside of coverage of a respective base station of the mobile communication network. Example embodiments according to all exemplary aspects may be utilized in at least two scenarios:

The apparatus according to the third exemplary aspect (e.g. a remote UE) and the relay mobile device (an apparatus according to the first exemplary aspect; e.g. relay UE) are served by the same base station (e.g. apparatus according to the second exemplary aspect); or The apparatus according to the third exemplary aspect (e.g. a remote UE) and the potential relay mobile device (an apparatus according to the first exemplary aspect; e.g. relay UE) are served by different base stations (both of such different base stations may be respective apparatuses according to the second exemplary aspect).

According to an exemplary embodiment of the first exemplary aspect, the virtual relay context information is obtained prior to the at least one condition is fulfilled and/or the activation indication is obtained.

Thus, the virtual relay context information may be obtained, e.g. received before activating the virtual relay context information e.g. that is stored (e.g. held available) in a memory, is performed and/or controlled. In this way, a respective relay mobile device candidate having obtained the virtual relay context information may be prepared to serve as a respective relay mobile device. In case the respective relay mobile device should serve as such a relay mobile device, it applies the virtual relay context information. This allows the relay activation to be fast and more robust as the mobile communication network may easily fall back on another relay mobile device candidate (which is also prepared to serve as a relay mobile device), e.g. should the applying by the respective relay mobile device candidate fail or time out, to name but a few non-limiting examples.

According to an exemplary embodiment of the first exemplary aspect, the method further comprises:

determining whether or not the at least one condition of the one or more conditions is fulfilled, wherein the one or more conditions enable the apparatus to serve as a relay mobile device between the at least one remote mobile device and the base station, wherein the virtual relay context information is applied based, at least in part, on the determining.

The apparatus according to the first exemplary aspect may perform and/or control one or more measurements to determine whether or not at least one condition is fulfilled. For instance, this may be a relay measurement condition. Further, the apparatus according to the first exemplary aspect may wait for such a relay measurement condition to be fulfilled. Possibly, the at least one condition may be associated with the virtual relay context information. To determine whether or not at least one condition is fulfilled, after obtaining of the virtual relay context information, the apparatus according to the first exemplary aspect may store the obtained virtual relay context information.

The one or more conditions may be at least one of the following: the apparatus (according to the third exemplary aspect) for which traffic is to be relayed being currently be out of coverage of its serving base station, and/or the apparatus is subject to a bad radio link, to name but a few non-limiting examples.

The respective relay mobile device (e.g. apparatus according to the first exemplary aspect) to be selected by the apparatus according to the third exemplary aspect for which traffic is to be relayed may be determined (e.g. evaluated) to be a suitable candidate, e.g. since the respective relay mobile device fulfils one or more conditions comprised by the virtual relay context information to act as the respective relay mobile device.

According to an exemplary embodiment of the first exemplary aspect, the virtual relay context information is obtained by the apparatus and at least one other apparatus to serve the at least one remote mobile device as a respective relay mobile device to relay traffic between the at least one remote mobile device and a base station of a mobile communication network.

The virtual context information may be associated to a respective remote mobile device so that it is specific for the respective remote mobile device. This may allow that one or more relay mobile device candidates can freely switch among them, as long as they are serving the considered remote mobile device.

According to an exemplary embodiment of the first exemplary aspect, the method further comprises:

providing at least one condition indication indicative of at least one condition of the one or more conditions is fulfilled.

In case the determining has led to the result that at least one condition is fulfilled, the at least one condition indication may be provided (e.g. sent) to a respective remote mobile device, e.g. the apparatus according to the third exemplary aspect. Based on such at least one condition indication, the apparatus according to the third exemplary aspect may select its relay mobile device among the one or more relay mobile device candidates.

According to an exemplary embodiment of the third exemplary aspect, the method further comprises:

providing an activation indication indicating to apply a virtual relay context information to the selected relay mobile device.

According to an exemplary embodiment of the first exemplary aspect, the method further comprises:

obtaining the activation indication indicating to apply the virtual relay context information from the at least one remote mobile device, wherein the virtual relay context information is applied based, at least in part, on the obtained activation indication of the at least one remote mobile device.

After the selecting of the relay mobile device to relay the traffic, the apparatus may indicate its selection, e.g. to the selected relay mobile device. Additionally or alternatively, the apparatus may indicate its selection to the mobile communication network, e.g. its serving base station and/or to the selected relay mobile device, to name but a few non-limiting examples. Thus, the activation indication may be provided by the apparatus according to the third exemplary aspect. Accordingly, the activation information may be obtained (e.g. received) by the apparatus according to the first exemplary aspect.

The apparatus according to the third exemplary aspect may indicate the selected relay mobile device (e.g. apparatus according to the first exemplary aspect) e.g. implicitly by providing (e.g. transmitting) traffic (e.g. data) to the selected relay mobile device, e.g. via a sidelink (e.g. PC5 interface). The apparatus according to the first exemplary aspect may indicate the selected relay mobile device e.g. explicitly by providing a dedicated message (e.g. RRC message) to the selected relay mobile device. Such a message may also be provided via a sidelink to the selected relay mobile device.

Upon reception of such an activation indication, the selected relay mobile device may apply the virtual relay context information enabling the apparatus according to the third exemplary aspect and/or the relay mobile device to be configured (e.g. set up) for relaying traffic of the apparatus according to the third exemplary aspect.

According to an exemplary embodiment of all exemplary aspects, the virtual relay context information comprises at least part of the one or more conditions for the one or more relay mobile device candidates enabling a respective relay mobile device to apply the virtual relay context information to relay the traffic of the remote mobile device.

The one or more conditions may enable a respective remote mobile device (e.g. according to the third exemplary aspect) e.g. to select a respective relay mobile device for relaying its traffic. The one or more conditions may enable a respective relay mobile device candidate (e.g. apparatus according to the first exemplary aspect) to determine whether or not to apply the virtual relay context information. By applying the virtual relay context information, a respective relay mobile device may be configured to relay the traffic of the respective remote mobile device.

The mobile communication network (e.g. base station, e.g. apparatus according to the second exemplary aspect) may also configure one or more conditions for a relay mobile device candidate to consider itself as a qualified relay candidate to use the virtual relay context information (e.g. virtual relay UE context). Thus, only the relay mobile device candidate(s) fulfilling the configured condition(s) can (e.g. directly) apply the virtual relay context information to serve the apparatus according to the third exemplary (e.g. remote UE).

The one or more conditions may be evaluated by the apparatus according to the first exemplary aspect prior to the apparatus performing and/or controlling a relaying of traffic from and/or to the base station, and/or during the relaying of traffic from and/or to the base station.

The configured condition(s) may be also used by the apparatus according to the first and/or third exemplary aspect to use the virtual relay context information to directly communicate with the base station, as disclosed above.

According to an exemplary embodiment of all exemplary aspects, the virtual relay context information comprises at least one of the following:

an identifier corresponding to the virtual relay context information (e.g. Cell Radio Network Temporary Identifier (C-RNTI));

scheduling configuration (e.g. Semi-Persistent Scheduling (SPS));

configured grant (CG) configuration;

one or more bearer configurations (e.g. Signaling Radio Bearer(s) (SRB), and/or DRB(s) (Data Radio Bearer));

channel configuration (e.g. Logical Channel (LCH) configuration);

Upper layer configuration (e.g. Radio Resource Control (RRC) layer configuration, and/or non-access stratum (NAS) layer configuration);

Medium Access Layer (MAC) layer configuration (e.g. Layer-2 configuration); and

Physical (PHY) layer configuration (e.g. Layer-1 configuration).

The virtual relay context information may comprise some or all of the aforementioned context. In this way, the (e.g. same) virtual relay context information may be used by any relay mobile device candidate (e.g. that qualifies for relaying traffic of the apparatus with mobile communication network, e.g. based on the one or more conditions that are evaluated) to relay traffic for the apparatus according to the third exemplary aspect. Additionally, such context may be used by the respective apparatus according to the first exemplary aspect to communicate with a respective base station that has configured the virtual relay context information accordingly, e.g. an apparatus according to the second exemplary aspect.

According to an exemplary embodiment of the first exemplary aspect, the method further comprises:

providing a condition change indication indicative of a change of the at least one condition disabling/enabling the apparatus to apply the virtual relay context information and serve as a relay mobile device between the at least one remote mobile device and the base station.

Further, the relay mobile device may perform and/or control the determining of whether or not the at least one condition of the one or more conditions is fulfilled throughout it serving as a relay mobile device. For instance, in case the at least one condition e.g. based on which the apparatus has applied the virtual relay context information may not be fulfilled (e.g. anymore) or will not be fulfilled after a certain time, the respective relay mobile device may indicate this to the respective remote mobile device which it serves or has served as a relay mobile device.

According to an exemplary embodiment of the second exemplary aspect, the method further comprises:

communicating with the at least one remote mobile device via the relay mobile device by using the provided virtual relay context information.

The at least one remote mobile device may be an apparatus according to the third exemplary aspect. The relay mobile device may be an apparatus according to the first exemplary aspect. The communicating between the at least one remote mobile device and the apparatus (according to the second exemplary aspect) may take place via the relay mobile device by using the provided virtual relay context information.

The relay mobile device used to communicate with the at least one remote mobile device may be switched. The virtual relay context information may allow different relay UEs (e.g. relay mobile device candidates) to use the same virtual context to serve the same remote UE, e.g. in different time instances.

According to an exemplary embodiment of the second exemplary aspect, the method further comprises:

obtaining discovery information indicative of a presence of one or more relay mobile device candidates, wherein the virtual relay context information is configured based, at least in part, on the discovery information.

According to an exemplary embodiment of the third exemplary aspect, the method further comprises:

providing discovery information indicative of a presence of one or more relay mobile device candidates.

The discovery information may be provided to a base station (e.g. the serving base station, e.g. apparatus according to the second exemplary aspect) of the apparatus according to the third exemplary aspect. The discovery information may be provided via a direct link (e.g. established) between the apparatus and the base station. Alternatively or additionally, the discovery information may be provided to the base station via a respective relay mobile device that relays traffic, here the discovery information to its serving base station. This allows the apparatus according to the second exemplary aspect to obtain (e.g. receive) the discovery information.

Further, the serving base station of the respective relay mobile device may transmit the discovery information to one or more further base stations via the mobile communication network.

Prior to the providing of the discovery information, the discovery information may for instance be gathered, e.g. by the apparatus according to the third exemplary aspect. For instance, the apparatus may gather (e.g. measure) which signals of one or more relay mobile device candidates are observable (e.g. receivable) at its (e.g. current) location. Further, the apparatus may request to indicate which one or more mobile device may be suitable relay mobile devices. The respective relay mobile devices may provide (e.g. transmit) a respective response to the apparatus.

The discovery information may be gathered (e.g. measured) by the apparatus according to the third exemplary aspect, e.g. by the apparatus determining whether or not one or more mobile device are located in its proximity. The apparatus may further determine whether or not one or more mobile device that are located in its proximity may serve as potential mobile devices for relay its traffic. Thus, the one or more mobile device that are located in the proximity of the apparatus according to the third exemplary aspect may be one or more relay mobile device candidates. This may be done by checking one or more conditions, e.g. whether one or more conditions are fulfilled by the respective relay mobile device candidates. Whether or not the one or more mobile device are located in the proximity of the apparatus may be gathered e.g. determining whether or not one or more signals sent by the respective mobile devices are observable. Additionally or alternatively, e.g. the one or more mobile devices may be requested to acknowledge their presence, e.g. by a corresponding request, e.g. that is broad-casted. In case an acknowledgement is obtained, the pres-ence of the respective mobile device from which the acknowledgement is obtained can be gathered. The results may be determined to be represented or comprised by the discovery information. Further, the gathering of the discov-ery information may not be limited to one or more relay mobile device candidates in a coverage of a serving cell of a respective base station from the apparatus according to the third exemplary aspect. Also, the presence of one or more relay mobile device candidates being located in a neighbor-ing cell served by the same or different base station may be gathered. Accordingly, the discovery information may rep-resent or comprise this as well.

The apparatus according to the third exemplary aspect (e.g. remote UE) may be configured to report to network the presence of such relay mobile device candidates (e.g. poten-tial proximity relay UEs) in the coverage of its serving cell and/or the presence of such relay mobile device candidates in the coverage of neighboring cell(s). The apparatus accord-ing to the third exemplary aspect may report this, e.g. by providing discovery information, e.g. to a respective serving base station, as disclosed above.

For gathering of the discovery information, the apparatus according to the third exemplary aspect may identify which cell(s) the relay mobile device candidate is (are) connected to or camped in. For instance, identification of the connected or camped cell may be indicated explicitly in a sidelink discovery message obtained by the apparatus according to the third exemplary aspect for gathering the discovery information. Additionally or alternatively, the identification of the connected or camped cell may be implicitly derived by the apparatus based, at least in part, on e.g. resource(s) that the respective acknowledgement (e.g. a discovery mes-sage/signal) is transmitted with.

The discovery information may further comprise one or more identities (e.g. identifiers of the respective relay mobile device candidates).

According to an exemplary embodiment of the second exemplary aspect, wherein the configuring of the virtual relay context information further comprises:

determining the one or more relay mobile device candi-dates; and configuring the virtual relay context information based on a respective capability of the determined relay mobile device candidates.

According to an exemplary embodiment of the second exemplary aspect, the method further comprises:

determining one or more capabilities of the one or more relay mobile device candidates, wherein the virtual relay context information is configured based, at least in part, on the determined one or more capabilities of the one or more relay mobile device candidates.

The one or more capabilities of a relay mobile device candidate may be derived by the network, e.g. the base station. The network may be aware of the respective capa-bilities of the relay mobile device candidates before example embodiments according to all exemplary aspects take place. Thus, a remote mobile device may be needed to provide (e.g.

send) the ID(s) of the relay mobile device candidates to the network, and the network may fetch the corresponding one or more capabilities (e.g. UE capability information) of the corresponding relay mobile device candidate(s) associated with the received ID (s).

According to an exemplary embodiment of the second exemplary aspect, the method further comprises:

configuring a hand over of the respective remote mobile device via its relay mobile device to a target base station.

In case a respective (e.g. selected) relay mobile device has applied the virtual relay context information, it is enabled to hand over a respective apparatus according to the third exemplary aspect from one base station to another, although the apparatus according to the first exemplary aspect may not (e.g. currently) have a link established to a target base station of the mobile communication network to which it is to be handed over. Further, another relay mobile device served by the target base station may be configured to be handed over. In addition or in the alternative, the respective relay mobile device used for the hand over may be config-ured with the virtual relay context information. This may allow the respective relay mobile device to perform accord-ing to example embodiments of all exemplary aspects in a hand over.

The apparatus of the second exemplary aspect may con-figure the handover, e.g. by performing the signaling to hand over the apparatus according to the third exemplary aspect (e.g. from a source base station that was the last that served the apparatus according to the first exemplary aspect) to a target base station (e.g. neighbor cell) via a respective selected relay mobile device. The respective remote mobile device may thus be handed over. For instance, the remote UE may be handed over to a new cell but still as a remote UE using a new relay mobile device which is already in the new cell (i.e. not handed over). The current relay mobile device may not be handed over and the "target" relay mobile device of the new cell is already in the target cell, but the remote mobile device may be moved from one relay mobile device serving the remote mobile device to another relay mobile device to serve the remote mobile device in the new cell. The hand over procedure itself may be served via the current serving relay mobile device of the remote mobile device.

According to an exemplary embodiment of the second exemplary aspect, the method further comprises:

providing the virtual relay context information via a second base station and a respective relay mobile device that is served by the second base station.

This may allow to provide the virtual relay context information to one or more relay mobile device candidates and/or to a remote mobile device via a second base station and another relay mobile device that is served by the second base station to the respective one or more relay mobile device candidates and/or to the respective remote mobile device.

A selected relay mobile device may be utilized, by the apparatus according to the third exemplary aspect, for com-municating with a base station of a mobile communication network. A respective (e.g. selected) relay mobile device may be within a coverage (e.g. area) of a respective base station. The base station may have served or serves the apparatus according to the third exemplary aspect. The base station may be another base station that does not serve the apparatus according to the third exemplary aspect. For instance, the apparatus may have moved out or is moving out of the coverage of the respective base station, so that it cannot be served directly by the base station (e.g. anymore). In case the selected relay mobile device is configured with the virtual relay context information, thus, has applied the virtual relay context information, traffic provided to it by the apparatus may be relayed by the selected relay mobile device to the base station. Further, traffic from the base station is relayed via the relay mobile device to the apparatus. This may allow the apparatus to utilize the mobile communication network although it may currently be out of coverage, and/or subject to a bad radio link, to name but a few non-limiting example.

According to an exemplary embodiment of the third exemplary aspect, the method further comprises:

obtaining the virtual relay context information; and providing the virtual relay context information to the one or more relay mobile device candidates.

The virtual relay context information may be obtained from the mobile communication network, e.g. a base station (e.g. apparatus according to the second exemplary aspect). After the virtual relay context information is obtained, the apparatus may provide (e.g. send) the virtual relay context information to the one or more relay mobile device candidates, e.g. via PC5 interface. The one or more relay mobile device candidates may thus be enabled in case a respective relay mobile device is selected by the apparatus for relaying traffic to apply the virtual relay context information so that without further signaling the relaying can take place. Additionally or alternatively, the virtual relay context information may be provided (e.g. sent) to (e.g. all) the respective relay mobile device candidates (e.g. potential relay UE(s)) directly by network (e.g. apparatus according to the second exemplary aspect), e.g. over Uu interface.

According to an exemplary embodiment of the third exemplary aspect, the method further comprises:

obtaining at least one condition indication indicative of at least one condition of one or more conditions being fulfilled by at least one relay mobile device candidate; and providing an activation indication indicating to apply the virtual relay context information based, at least in part, on the at least one condition indication.

In case a relay mobile device candidate may have determined that at least one condition is fulfilled, the at least one condition indication may be obtained (e.g. received) from the respective relay mobile device, e.g. the apparatus according to the first exemplary aspect. Based on such at least one condition indication, the apparatus according to the third exemplary aspect may select its relay mobile device among the one or more relay mobile device candidates.

According to an exemplary embodiment of the third exemplary aspect, the virtual relay context information are configured/obtained from a target base station to which a hand over is to be performed.

The serving cell (e.g. the respective base station, e.g. a source base station respective source node) and a neighbor cell (e.g. another base station of the mobile communication network, e.g. a target base station respectively target node) may coordinate to hand over the apparatus from the serving cell to the neighbor cell. This may take place via a selected relay mobile device of the apparatus. The selected relay mobile device may be served by the neighbor cell, even though the apparatus (e.g. remote UE) has not entered the coverage of the neighbor cell.

The neighbor cell may configure a (e.g. new or own) virtual relay context information (e.g. a virtual relay UE context) for the apparatus that is (e.g. to be) handed over. This may allow a dynamic reselection of one or more relay mobile devices (out of one or more relay mobile device candidates) e.g. served by the neighbor cell, while the apparatus may not yet have a direct (e.g. RRC) connection established with the neighbor cell, thus is not yet handed over.

Example embodiments according to all exemplary aspects may utilize layer-2 and/or layer-3 UE-to-Network relay. Example embodiments according to all exemplary aspects may also be applicable for UE-to-UE relay scenarios, where a relay mobile device (e.g. relay UE) may be configured and used to relay traffic between another two mobile devices, which may be respective apparatuses according to the first and/or third exemplary aspect. For instance, this may be enabled by using the (e.g. configured) virtual relay context information enabling communication between the respective mobile devices. In case of UE-to-UE relay, the virtual relay context information may be configured by network and/or a mobile device (e.g. UE) involved in the UE-to-UE relay communication.

The features and example embodiments described above may equally pertain to the different aspects according.

It is to be understood that the presentation in this section is merely by way of examples and non-limiting.

Other features will become apparent from the following detailed description considered in conjunction with the accompanying drawings. It is to be understood, however, that the drawings are designed solely for purposes of illustration and not as a definition of the limits n, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding and shall be understood to complement and be read together with the description as provided in the above summary section of this specification.

Figure 1:
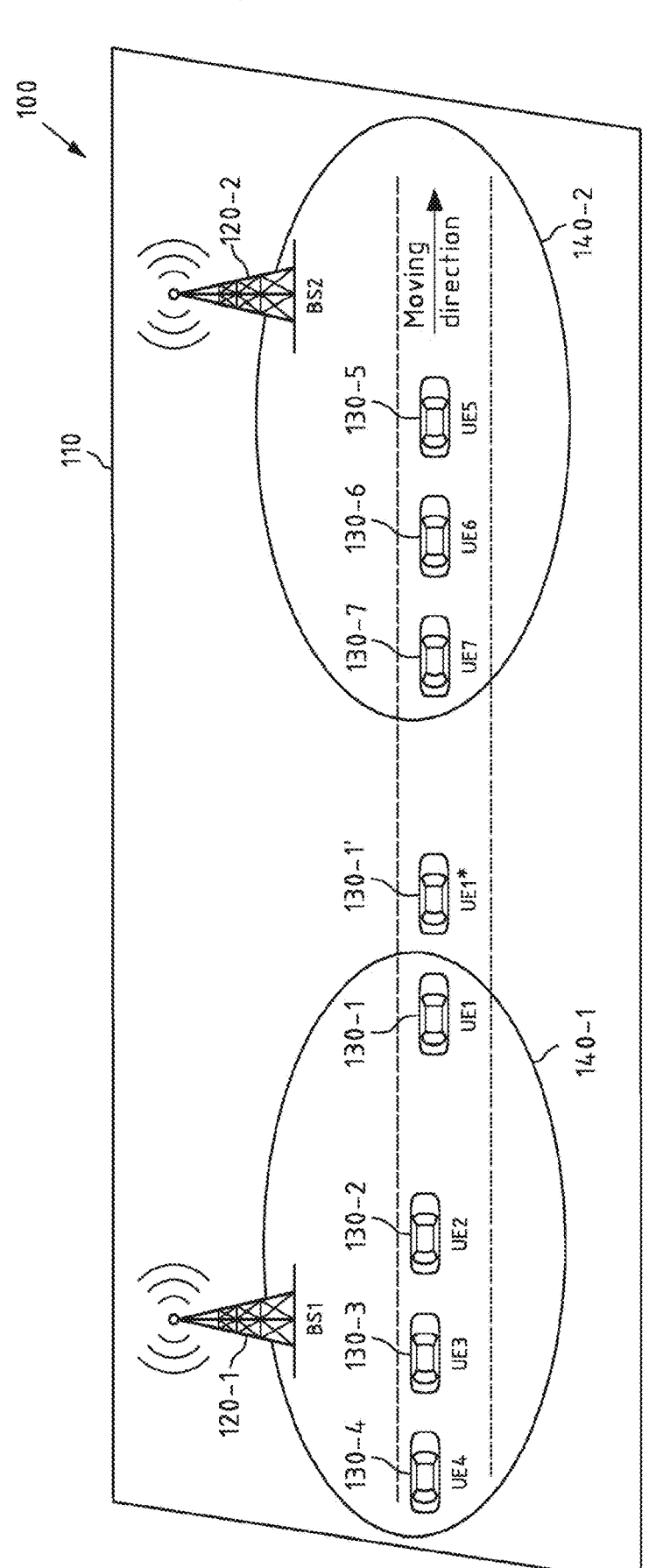
FIG. 1 a schematic block diagram of a system according to an exemplary aspect.

FIG. 1 is an example of a schematic high-level block diagram of a system 100 that is configured to perform and/or control the respective method(s) according to all exemplary aspects.

System 100 comprises a mobile communication network 110, which is schematically shown by the rectangular shape. It will be understood that this shape does not represent a coverage area of the mobile communication network 110, but a sort of grouping of one or more entities that may utilize the mobile communication network 110.

System 100 comprises one or more mobile devices 130-1 to 130-7. A respective mobile device 130-1 130-7 may be an apparatus according to the first exemplary aspect.

The system 100 further comprises a plurality of base stations, at present gNBs 120-1 and 120-2 which signals are observable by the mobile devices 130-1 to 130-7. Here, the mobile devices 130-1 to 130-4 can observe the signals of the base station 120-1. Thus, mobile devices 130-1 to 130-4 are located in the coverage and/or cell 140-1 of the base station 120-1. The mobile devices 130-5 to 130-7 are located in the coverage and/or cell 140-2 of the base station 120-2. One or more further of such base stations may be part of the mobile communication network 110, not shown in FIG. 1.

The mobile devices 130-1 to 130-7 move along e.g. a street in the moving direction, as illustrated in FIG. 1.

The mobile device 130-1 is shown to move out of coverage 140-1 of the base station 120-1. The situation when the mobile device 130-1 is out of coverage 140-1—is shown by the illustration of the mobile device 130-1'. Further, the respective mobile devices 130-1 to 130-7 may be located within vehicles that move along the street. This is illustrated by the arrow pointing to the right labelled "Moving direction". Thus, after the mobile device 130-1 has moved out of coverage 120-1, one or more of the mobile devices 130-2 to 130-4 may also move out of coverage 120-1. Then, the mobile devices 130-1 to 130-4 may move into coverage 120-2, starting with mobile device 130-1.

To enable communication between the mobile device 130-1 to 130-7, one or more of the base stations 120-1 and 120-2 and/or further entities not shown in FIG. 1, the mobile communication network 110 of the system 100 may be used. The mobile communication network 110 may be a cellular (e.g. according to 3G/4G/5G/NR or future communication standard) network. Additionally or alternatively, a non-cellular communication network, such as a satellite-based communication network or the Internet may also be utilized to enable communication, to name but a few non-limiting examples. It will be understood that information may be sent from the mobile devices 130-1 to 130-7 to the base stations 120-1, 120-2, and vice versa. Also, communication may take place between the base stations 120-1, 120-2.

Example embodiments enabling respective method(s) according to the first, second and/or third exemplary aspect may utilize the architecture shown by the system 100 of FIG. 1.

Example embodiments according to all exemplary aspect may for instance enable the following: The network (e.g. mobile communication network 110) may configure a virtual relay UE context (e.g. the virtual relay context information) for a remote UE (e.g. the mobile device 130-1), since the mobile device is moving or has moved out of coverage 140-1. The virtual relay context information may be used by any proper relay UE (e.g. the one or more relay mobile device candidates, e.g. mobile devices 130-2 to 130-4 of coverage 140-1, and/or mobile devices 130-5 to 130-7 of coverage 140-2). The virtual relay context information may be provided via the serving base station 140-1 to the mobile device 130-1, which may provide, e.g. via a PC5 interface, the virtual relay context information to the one or more relay mobile device candidates. Additionally or alternatively, via base station 120-1 and/or base station 120-2, the virtual relay context information may be provided (e.g. directly) from the mobile communication network 110 to the one or more relay mobile device candidates. The one or more relay mobile device candidates may be in the vicinity or proximity of the mobile device 130-1. The mobile device 130-1 respectively 130-1' may select one of the one or more relay mobile device candidates to be the relay mobile device, e.g. mobile device 130-2. Then, the mobile device 130-1 respectively 130-1' may indicate its selection to the mobile device 130-2. Since the respective mobile device 130-2 has obtained (e.g. received) the virtual relay context information, the mobile device 130-2 selected as the relay mobile device can apply the virtual relay context information enabling the mobile device 130-1, e.g. when it has moved out of coverage 140-1, to relay traffic via the relay mobile device 130-2 which is served by base station 120-1.

Figure 2:
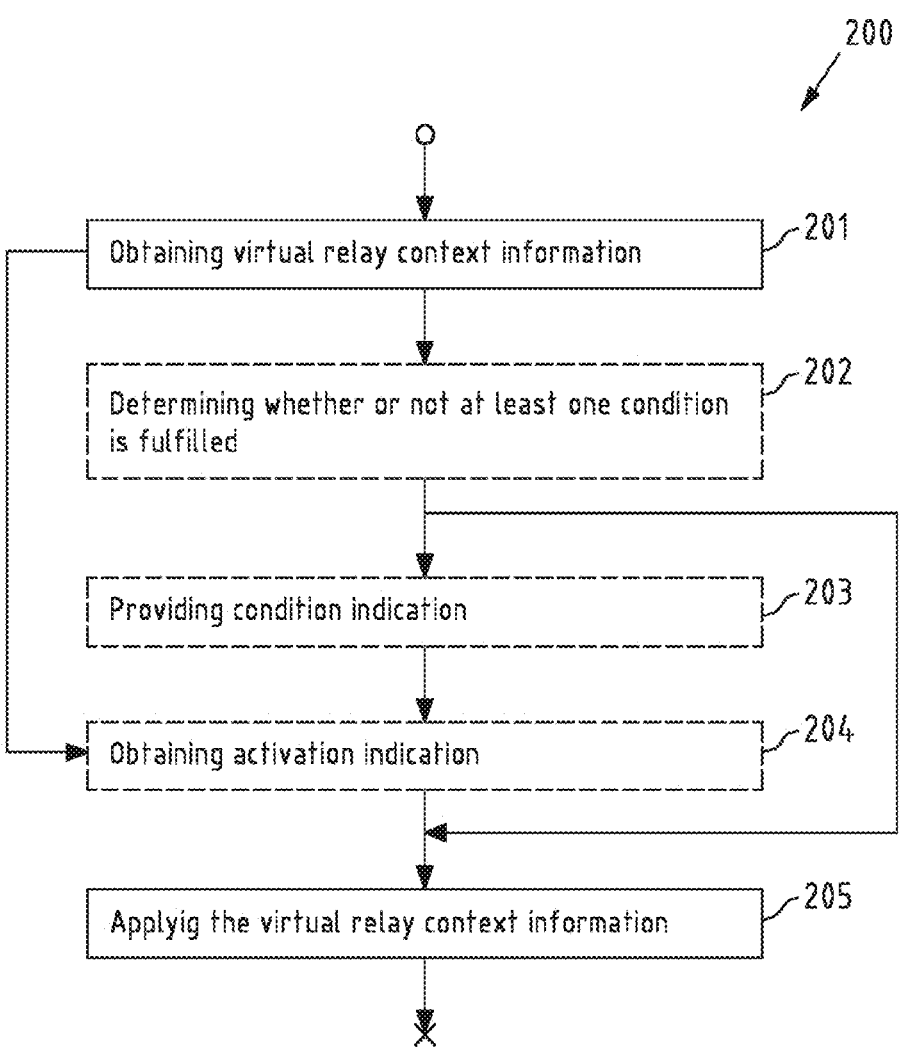
FIG. 2 a flowchart showing an example embodiment of a method according to the first exemplary aspect.

FIG. 2 is a flowchart 200 showing an example embodiment of a method according to the first exemplary aspect. This flowchart 200 may for instance be performed by a mobile device 130-2 to 130-7 of FIG. 1, e.g. a relay UE.

In a first step 201, virtual relay context information are obtained, e.g. from a base station (e.g. base station 120-1, 120-2 of FIG. 1) of a mobile communication network. The virtual relay context information may be received directly from such a base station, or via a remote mobile device (e.g. mobile device 130-1 of FIG. 1) which provides the virtual relay context information to the apparatus performing and/or controlling flowchart 200 of FIG. 2 after it has obtained (e.g. received, see steps 402 and 403 of FIG. 4) the virtual relay context information.

In an optional second step 202, it is determined whether or not at least one condition, e.g. as specified by the obtained virtual relay context information, is fulfilled. In case such at least one condition is fulfilled, the apparatus performing and/or controlling flowchart 200 of FIG. 2, in a fifth step 205, applies the virtual relay context information to serve a remote mobile device as its relay mobile device enabling the remote mobile device to communicate with a base station via the relay mobile device.

Additionally, in an optional third step 203, condition indication is provided, e.g. by sending the condition indication to a remote mobile device enabling the remote mobile device to select a relay mobile device among a plurality of relay mobile devices.

In case the apparatus performing and/or controlling flowchart 200 of FIG. 2 is selected by such a remote mobile device to serve it as a relay mobile device, in an optional fourth step 204, an activation indication is obtained (e.g. received) from the respective remote mobile device. Such an activation indication may also be obtained without provision of a condition indication. Based on such activation indication, the apparatus performing and/or controlling flowchart 200 of FIG. 2 may also apply the virtual relay context information in the fifth step 205.

Figure 3:
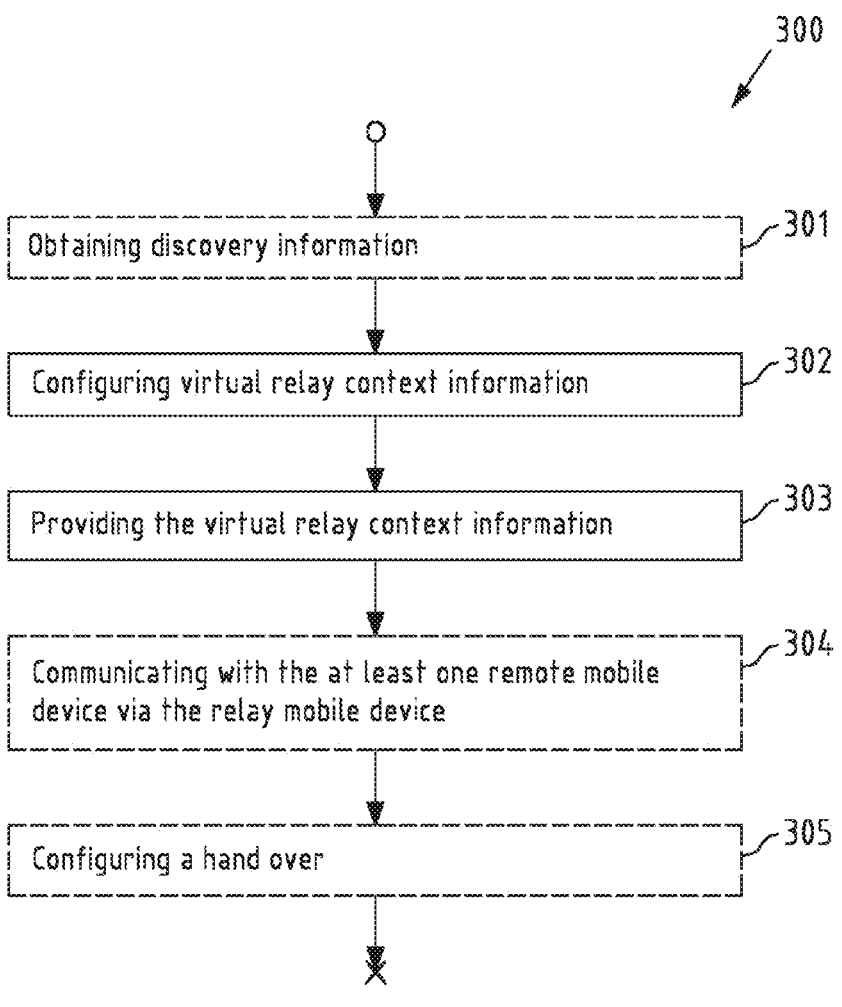
FIG. 3 a flowchart showing an example embodiment of a method according to the second exemplary aspect.

FIG. 3 is a flowchart 300 showing an example embodiment of a method according to the second exemplary aspect. This flowchart 300 may for instance be performed by a respective base station 120-1, and/or 120-2 of FIG. 1.

In an optional first step 301, discovery information are obtained, e.g. from a respective mobile device (e.g. mobile device 130-1). The discovery information may be obtained, e.g. by receiving the discovery information. The discovery information may be received directly from the respective mobile device, or via a selected relay mobile device of the respective mobile device.

In a second step 302, the virtual relay context information are configured. The virtual relay context information may be configured, e.g. based at least in part, on the discovery information. The virtual relay context information may be configured for a certain remote mobile device, e.g. mobile device 130-1 of FIG. 1. The virtual relay context information may be configured on one or more further information This may enable that when the respective mobile device and/or the one or more relay mobile device candidates are in possession of the virtual relay context information, to enable configuring of a relay mobile device without further signaling being beneficial between a respective selected relay mobile device and the network.

In a third step 303, the virtual relay context information are provided, e.g. to the respective mobile device from which the discovery information are obtained in step 301, and/or additionally to the one or more relay mobile device candidates.

In an optional fourth step 304, after the virtual relay context information may be applied by an apparatus according to the first exemplary aspect (e.g. one of the mobile devices 130-2 to 130-7 of FIG. 1), communicating with a remote mobile device (e.g. mobile device 130-1 of FIG. 1) via a relay mobile device is enabled by using the provided virtual relay context information of step 303. In addition, the mobile communication network 110 may further evaluate, e.g. when configuring another virtual relay context information for another mobile device, that a certain mobile device is already selected as a relay mobile device for another mobile device, so that this relay mobile device may not be selected by a plurality of mobile devices as their respective relay mobile device. For instance, a respective mobile device being a relay mobile device may be limited to a certain number of "users", thus mobile devices for which it may relay traffic, to name but one non-limiting example.

In an optional fifth step 305, a hand over of the respective remote mobile device via a selected relay mobile device to a target base station is configured, enabling to hand over a respective mobile device (e.g. mobile device 130-1' of FIG. 1 that is out of coverages 140-1 and 140-2 of FIG. 1 to be handed over from its last serving base station (e.g. base station 120-1 of FIG. 1) to a neighbor base station (e.g. base station 120-2 of FIG. 1) although the respective mobile device 130-1' does not have a (e.g. direct) link established to base station 120-2.

The virtual relay context information may further be updated.

Figure 4:
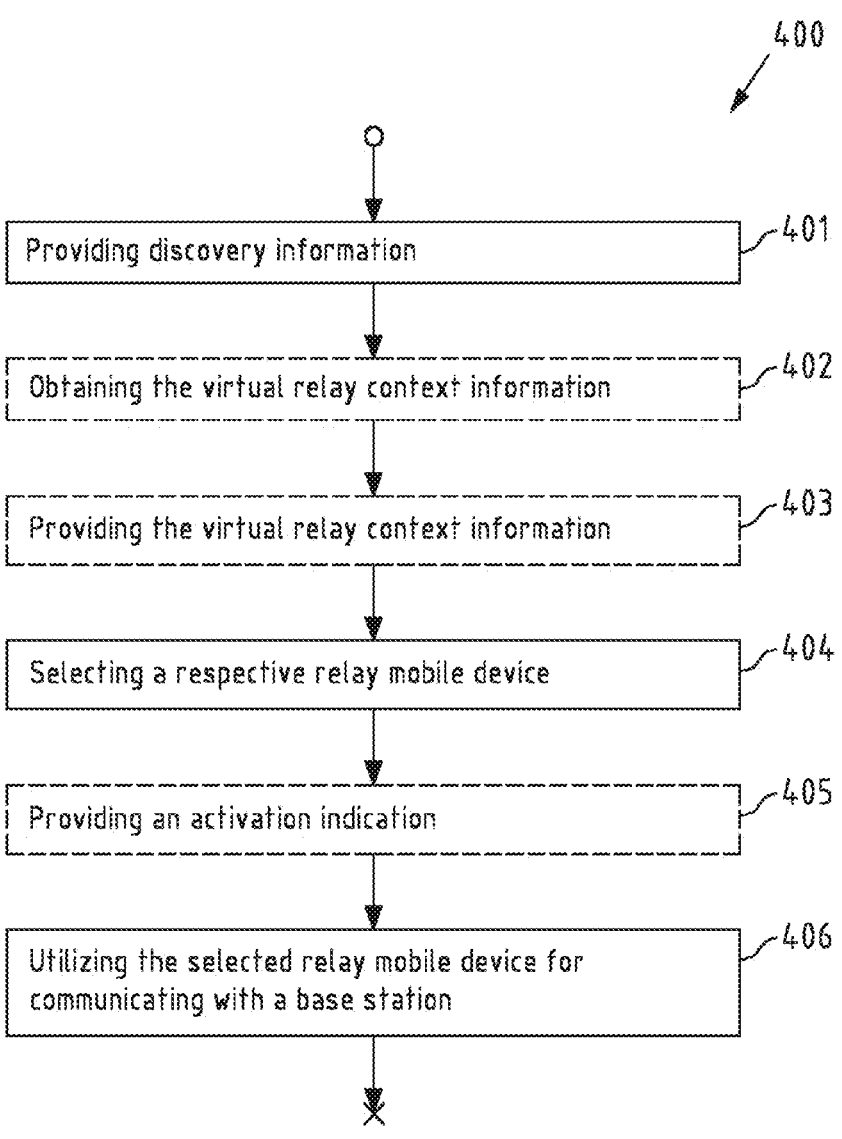
FIG. 4 a flowchart showing an example embodiment of a method according to the third exemplary aspect FIG. 5*a*, 5*b* a signaling associated with example embodiments of all exemplary aspects.

FIG. 4 is a flowchart 400 showing an example embodiment of a method according to the third exemplary aspect. This flowchart 400 may for instance be performed by a mobile device 130-1 (130-1') of FIG. 1, e.g. a remote UE.

In a first step 401, discovery information are provided, e.g. to a serving and/or neighbor base station 120-1 and/or 120-2 of FIG. 1. The discovery information may be provided directly to the respective base station 120-1 and/or 120-2, or via a selected relay mobile device. For instance, in case of FIG. 1, the mobile device 130-1' may have selected the mobile device 130-2 as its relay mobile device so that traffic is relayed via the mobile device 130-2. Thus, the mobile device 130-1' (out of coverage 140-1 of FIG. 1) may provide discovery information via the mobile device 130-2 to the base station 120-1. Prior to providing the discovery information, the apparatus performing and/or controlling the flowchart 400 may gather the discovery information, e.g. as disclosed above in the summary section.

In an optional second step 402, virtual relay context information are obtained. The virtual relay context information may be obtained, e.g. by receiving the virtual relay context information, e.g. from a serving and/or neighbor base station 120-1 and/or 120-2 of FIG. 1. The virtual relay context information may enable the apparatus performing and/or controlling the flowchart 400 to provide the virtual relay context information to one or more relay mobile device candidates so that the apparatus performing and/or controlling the flowchart 400 can select at least one of them as its selected relay mobile device to relay its traffic.

Thus, in an optional third step 403, the virtual relay context information are provided, e.g. to the one or more relay mobile device candidates, as disclosed above. In addition, the apparatus may gather new or updated discovery information which may be provided to network, as shown in step 401.

In a fourth step 404, a respective relay mobile device is selected, e.g. among the one or more relay mobile device candidates. Therefore, the apparatus performing and/or controlling the flowchart 400 and/or the relay mobile device candidates may evaluate one or more conditions. Further, apparatus may communicate, e.g. via PC5 interface with the one or more relay mobile device candidates to determine (e.g. check) whether one or more conditions are fulfilled by the respective relay mobile device candidate.

In an optional fifth step 405, an activation indication is provided to the selected relay mobile device (candidate). This may be indirectly, e.g. by the apparatus performing and/or controlling the flowchart 400 starting to provide traffic to be relayed by the respective selected relay mobile device so that the respective selected relay mobile device knows that it must be the selected relay mobile device, and/or the apparatus performing and/or controlling the flowchart 400 may provide a message (e.g. RRC message, MAC control element, etc.) to the selected relay mobile device. In both cases, the relay mobile device may apply the virtual relay context information that it may have obtained (e.g. received) earlier enabling the relay mobile device to act as the selected relay mobile device for the apparatus. In some embodiments, the relay mobile device may obtain the virtual relay context information together with such an activation indication.

In a sixth step 406, the traffic to be relayed is provided/obtained (e.g. sent/received) by the apparatus via the selected relay mobile device, e.g. via PC5 interface enabling direct connection between the apparatus and the respective selected relay mobile device. Additionally or alternatively, traffic sent by a base station via the relay mobile device is received from the relay mobile device, accordingly. The selected relay UE has applied the virtual relay context information, and it is enabled to communicate with network via Uu interface. Thus, communication between the remote mobile device and the base station can take place. The choice of which mobile device should act as a respective relay mobile device may change so that at least part of the flowchart 400 may be performed and/or controlled a plurality (e.g. at least twice) of times. Also, at least part of the flowchart 400 may be performed and/or controlled a plurality (e.g. at least twice) of times in case the remote mobile device reselects a (e.g. new) relay mobile device among the one or more relay mobile device candidates, e.g. in case the current serving relay mobile device is not proper anymore, to name but a one further and non-limiting example. Moreover, if the virtual relay context information further contains any configuration for the remote mobile device to apply in order to communicate with network via a selected relay mobile device applying the virtual relay context information, the remote mobile device may apply the configuration to communicate with network via the relay mobile device.

It will be understood that e.g. discovery information (e.g. new or updated discovery information) may be provided as it is deemed necessary, e.g. anytime throughout performing and/or controlling the flowchart 400.

Flowchart 200 of FIG. 2, flowchart 300 of FIG. 3, and/or flowchart 400 of FIG. 4 may be performed and/or controlled together enabling a signaling flow between a respective remote mobile device, one or more relay mobile devices respectively relay mobile device candidates, and a respective base station of a mobile communication network.

Figure 5A:
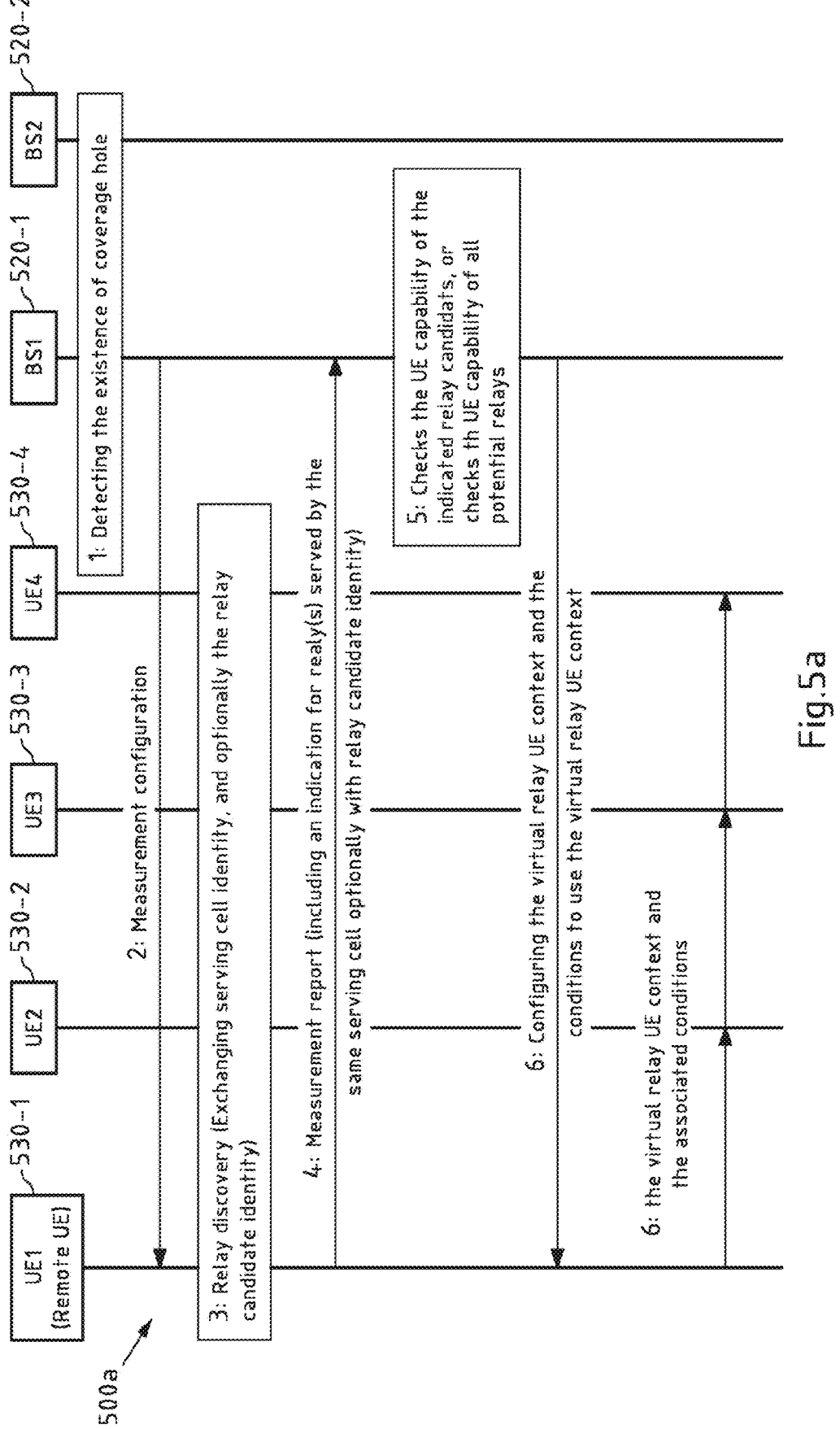
Figure 5B:
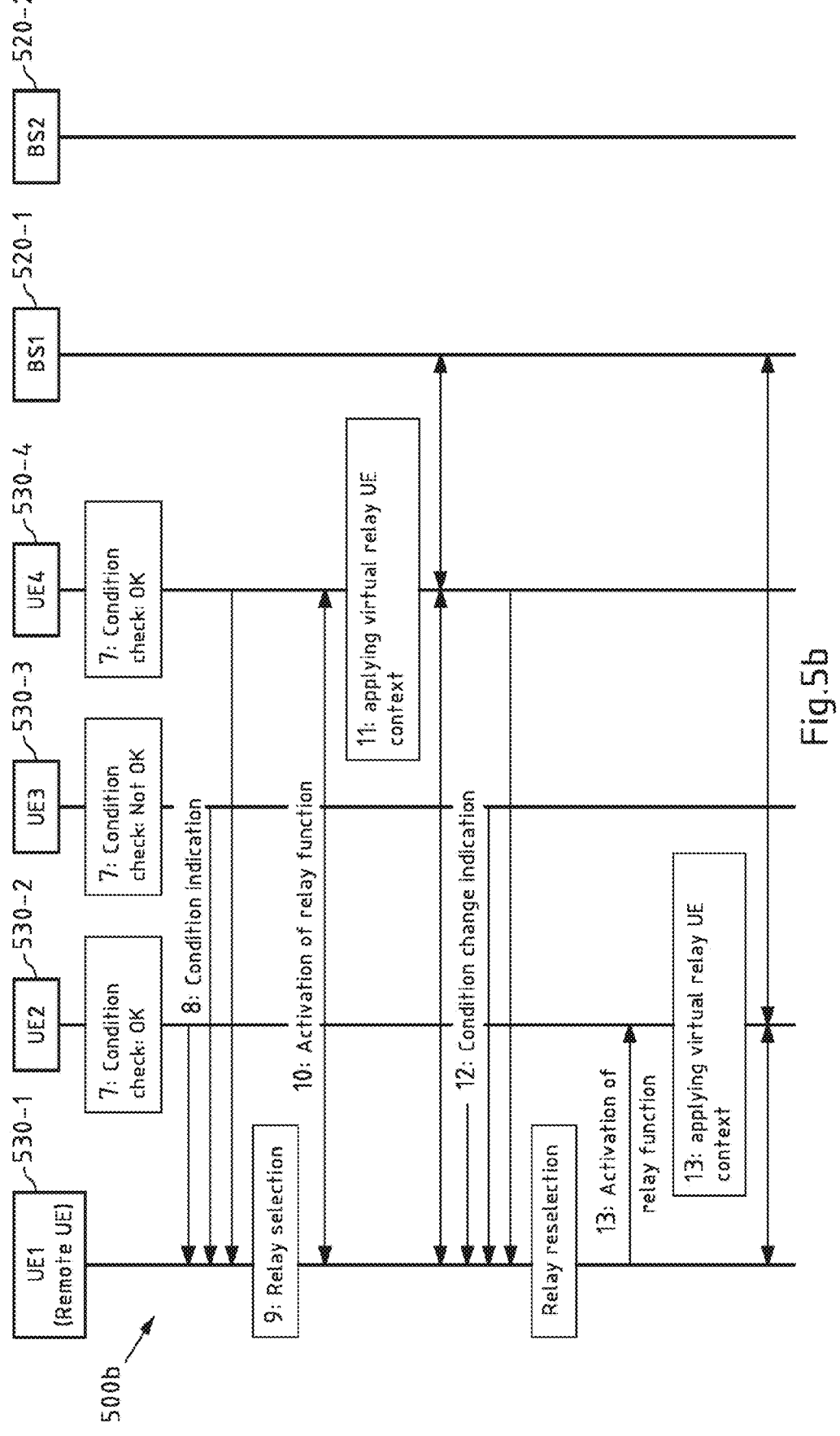

FIGS. 5a and 5b show example embodiments in which a respective mobile device (e.g. a remote UE 530-1; mobile device 130-1 of FIG. 1) and one or more respective relay mobile device candidates (e.g. candidate relay UE(s) 530-2 to 530-4; mobile device 130-2 to 130-4) are served by the same base station (e.g. base station 520-1, e.g. base station 120-1 of FIG. 1). Further, another base station 520-2 is shown.

The base station may be a gNB, and the network may contain one or multiple network nodes (e.g. gNB and/or AMF) deployed in a network (e.g. mobile communication network 110 of FIG. 1), e.g. of an operator.

In a first step, the serving cell (BS1: base station 1, e.g. base station 120-1 of FIG. 1) of UE1 (a remote UE, e.g. mobile device 130-1 of FIG. 1) may detect the potential need to apply UE-to-Network (mobile device to network) relay for its serving UE(s), e.g. in case there is a coverage hole.

In an example, a coverage hole may be detected by network, e.g. if:

A neighbor cell (e.g. BS2: base station 2, e.g. base station 120-2 of FIG. 1) after the coverage hole receives one or multiple RRCReestablishmentRequest message(s) over time, and The source cell (e.g. BS1) identified by the physical cell identity (e.g. physCellId) carried in the RRCReestablishmentRequest message(s) did not initiate a handover procedure for the corresponding UE(s).

In another example, the coverage hole may be identified by the UE when serving cell Uu-RSRP falls below a given threshold, while no neighboring cell's RSRP measurements is above another given threshold. The UE can then provide an "off periodic and off event triggered" measurement report to inform the network that it is getting close to a coverage hole problem.

In a second step, BS1 configures a measurement event for UE1 to trigger its relay discovery procedure, e.g. when the Uu-RSRP detected by UE1 is below a configured threshold. The value of the RSRP threshold may be configured higher than the minimal RSRP requirement to support the direct Uu connection between UE1 and its serving BS1. In this way, UE1 may still have a direct connection to BS1 after it discovers relay candidate (s).

In a third step, once the configured event for relay discovery procedure is triggered, UE1 discovers the potential relays in its proximity. This can be done by the current standardized relay discovery procedure (e.g. gathering discovery information) by using a discovery announcement/solicitation/response message over sidelink. In the discovery procedure, each relay candidate may transmit its serving/camping cell identity to UE1. In addition, the relay candidate may also transmit its own identity to UE1.

The detection/discovery of proximity relay UEs should allow the remote UE to identify which cell the proximity relay UEs are connected to or camped in. For instance, identification of the connected or camped cell may be indicated explicitly in a message (e.g. a SL discovery message). Or the identification of the connected or camped cell may be implicitly derived by the remote UE based on e.g. the resources that discovery message/signal is transmitted.

In a fourth step, UE1 sends a report to BS1 (e.g. providing discovery information) and indicates there is/are relay mobile device candidate(s) served by BS1. In addition, UE1 may also report the identity of the relay mobile device candidate(s) to BS1 (e.g. comprised by discovery information).

In a fifth step, BS1 may check the UE-capability information of the relay mobile device candidate (s). In case UE1 reported the UE identity of the relay mobile device candidate(s) along with the corresponding serving cell ID in the last step, BS1 may interact with other network nodes (i.e. the network node where the UE-capability information is stored) to get the UE-capability information by using the identity. In this way, one or more relay mobile device candidates may be sorted out since according to their respective UE-capability information they may not be suitable to act as a respective relay mobile device, e.g. by using the virtual relay context information.

In case UE1 did not report the identity of the relay candidate(s), BS1 may check the UE-capability information of all of its serving potential relay candidates (i.e. those serving relay mobile device candidate(s) which have indicated their interests to serve as a relay, e.g. by sending the SidelinkUEInformation message to network).

The UE-capability information may be collected by network from the legacy procedure over the Uu interface, e.g. by using UE capability enquiry procedure.

In a sixth step, BS1 may configure the virtual relay UE context (e.g. configuring virtual relay context information) for UE1 so that the relay mobile device candidate(s) can be used to relay UE1's traffic. In addition, BS1 may also configure the corresponding conditions to apply the virtual relay UE context.

The virtual relay UE context may include the necessary configuration information for a relay mobile device candidate (or a plurality of such candidates) to serve as the relay for UE1, e.g. C-RNTI, SPS/CG resource configuration, the configurations for SRBs, DRBs, LCHs, NAS, RRC, MAC, PHY, etc.

The configuration of the virtual relay UE context may take account of the UE-capability information obtained from step 5, such that the configured virtual relay context can be applicable for the considered relay mobile device candidate(s), e.g. by considering the minimal set of UE-capabilities from (e.g. all) relay mobile device candidate(s).

The condition(s) may include the restriction(s) and/or condition(s) for a relay mobile device candidate to serve as the relay by using the configured virtual relay UE context. For example, the condition(s) may include the radio condition(s) e.g. of PC5 and/or Uu that a relay UE (e.g. relay mobile device) should meet. In addition, the condition(s) may include other relevant information, such as minimal required UE-capability to apply the configured virtual relay UE context. Thus, as one example, if UE1 did not report the identity of the relay mobile device candidate(s) in step 4, BS1 may derive the UE-capability requirement, and it can be used by a relay mobile device candidate to check if it can meet the UE-capability requirements to apply the configured virtual relay UE context.

In another example, even if UE1 reported the identity of the discovered relay mobile device candidate(s) in step 4, the UE-capability requirement may still be checked by any potential new relay candidate(s) discovered in future. For instance, if a new relay mobile device candidate (e.g. a relay candidate that was not discovered in step 3) is discovered later, its UE-capability will be checked. In other words, the new relay mobile device candidate can only apply the configured virtual relay UE context if it can meet the minimal UE-capability requirement configured by BS1.

Transmission (e.g. providing virtual relay context information) of the configured virtual relay UE context and/or the corresponding condition(s) from BS1 to the relay mobile device candidate(s) served by it may be done:

Via UE1 (i.e. as shown in FIGS. 5a and 5b);

Alternatively or additionally, BS1 may directly broadcast/multicast/unicast at least part of the configuration to the relay mobile device candidate(s), which may be used to serve as a relay for UE1 (this approach is not shown in FIGS. 5a and 5b).

In a seventh step, after receiving the configured conditions (e.g. comprised by virtual relay context information), each relay mobile device candidate starts monitoring/checking whether the configured conditions to apply the virtual relay UE context are fulfilled or not, if the conditions have been configured. If the outcome of the condition check changes at a relay mobile device candidate, it may report the update to UE 1

In an eighth step, each relay mobile device candidate of the relay mobile device candidates should indicate to UE1 if it meets the one or more condition(s) to apply the virtual relay UE context. In FIGS. 5a and 5b, UE2 and UE4 report that they fulfill the configured condition(s) but not UE3.

In a ninth step, based on the received indication(s) from the relay candidate(s), UE1 performs the relay selection procedure from the relay mobile devices candidates that may apply the configured virtual relay UE context, e.g. by considering the SL-RSRP according to the current standardized approach. In FIGS. 5a and 5b, UE1 selects UE4 as the relay (e.g. selecting relay mobile device).

In a tenth step, UE1 sends an activation message (e.g. indication of a selected relay mobile device) to the selected relay (i.e. UE4 in FIGS. 5a and 5b) to activate (e.g. apply the virtual relay context information) the use of the configured virtual relay UE context.

In an eleventh step, upon receiving the activation message from UE1, UE4 applies the configured virtual UE context (e.g. applying the virtual relay context information) to serve as a relay between UE1 and BS1.

In a twelfth step, UE1 may perform a relay-reselection, e.g. upon receiving an updated condition (e.g. based, at least in part, on one or multiple new radio conditions, and/or new or updated virtual relay context information that may be obtained due to providing new or updated discovery information) indication from the relay candidate(s). In FIGS. 5a and 5b, the conditions at UE4 may become improper to act as a relay and, thus, UE1 may reselect another relay candidate (e.g. UE2).

In a thirteenth step, UE1 sends the activation message to the new relay UE (UE2), and UE2 directly applies the configured virtual relay UE context to serve UE1 without the need for further configuration from network. Thus, this proposed scheme avoids the relay configuration procedure e.g. over Uu for the new relay UE.

In one embodiment, the (e.g. network-configured) virtual relay UE context (e.g. virtual relay context information) may be valid for a configured time period and/or until an event is detected.

In case the context is valid for a certain configured time period, network may configure a new set of virtual relay UE context, e.g. before the configured time period expires.

An event may be configured and detected, e.g. upon UE1 sets up a connection with a new base station, either directly or via a relay served by the new base station.

Figure 6A:
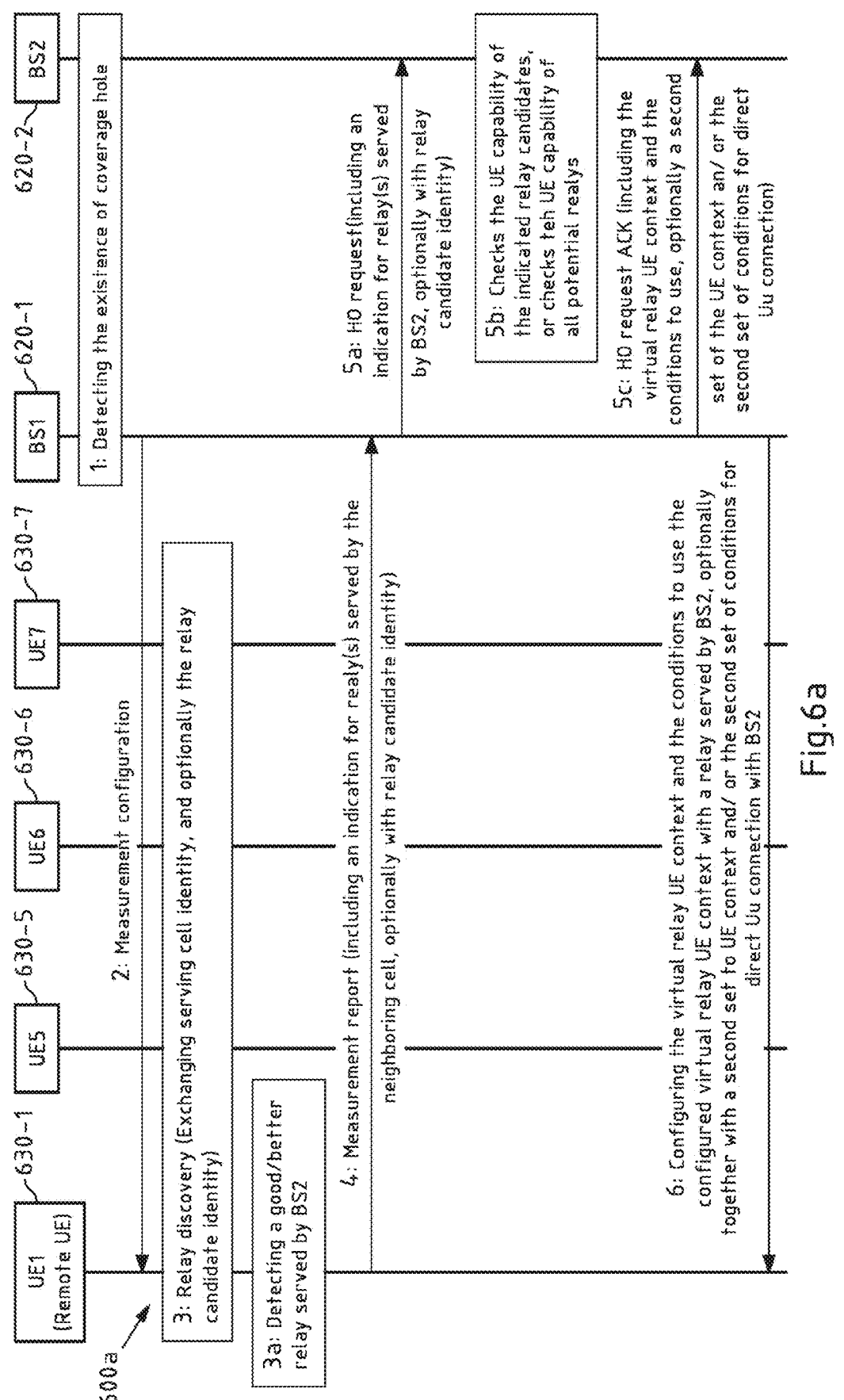
FIG. 6*a*, 6*b* another signaling associated with example embodiments of all exemplary aspects.
Figure 6B:
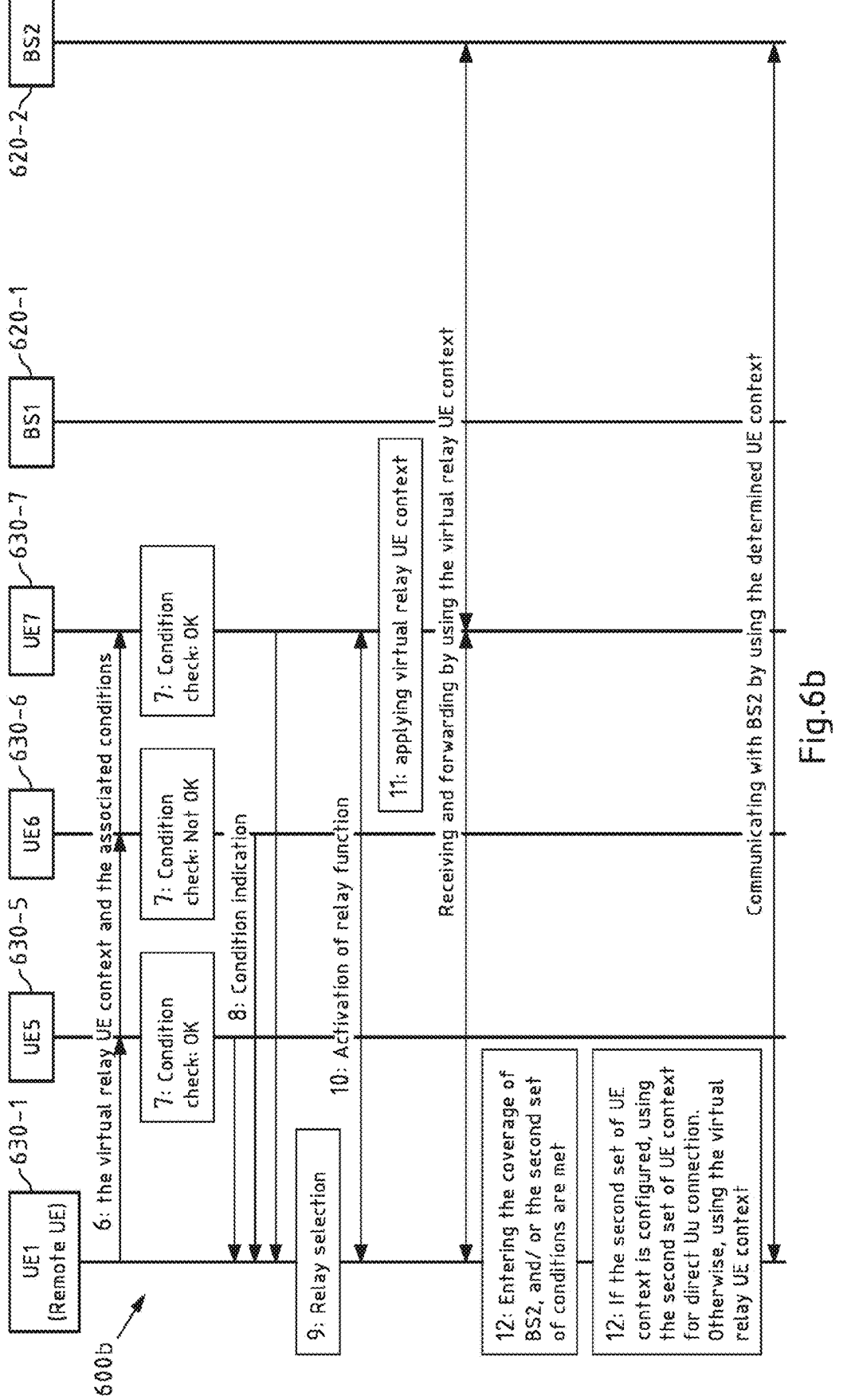

FIGS. 6a and 6b show example embodiments in which a respective mobile device (e.g. a remote UE 630-1; e.g. mobile device 130-1 of FIG. 1) and one or more respective relay mobile device candidates (e.g. candidate relay UE(s) 630-5 to 630-7; mobile device 130-5 to 130-7) are served by the different base stations 620-1 and 620-2 (e.g. base station 120-1 and base station 120-2 of FIG. 1).

If the relay mobile device candidates and the remote UE are served by different base stations, the flowchart is plotted in FIGS. 6a and 6b as an example. Before the following procedure takes place, it is assumed that UE1 is served by BS1 (base station 120-1 of FIG. 1) either directly via Uu or via a relay UE, while there are relay mobile device candidate(s) (e.g. UE5, UE6, and UE7) served by another neighboring cell (e.g. BS2; e.g. base station 120-2 of FIG. 1). The differences compared to the previous example embodiment shown in FIGS. 5a and 5b, where the UEs are served by the same cell (e.g. BS1) are highlighted.

In a (e.g. different) third step, UE1 may discover that the relay mobile device candidate(s) are served by a neighboring cell (BS2). UE1 may further detect that the relay mobile device candidate (s) by BS2 are more appropriate to act as relay then the relay mobile device candidate(s) served by BS1. For example, UE1 may have detected/discovered more relay candidate(s) in the coverage of BS2 than in the coverage of BS1. In addition, UE1 may consider the SL-RSRPs from the relay candidates served by the different base stations to determine the most proper ones, e.g. UE1 monitors a better SL-RSRP from the relay(s) served by BS2 than the one(s) served by BS1 in the relay discovery procedure.

In a fourth step, UE1 may indicate/report to BS1 that the relay mobile device candidate(s) are served by BS2, optionally together with the identity of the relay mobile device candidate(s).

In a fifth step (5.a), BS1 may send a handover (HO) request to BS2 and indicates the presence of the relay candidate(s) served by BS2, optionally together with the relay mobile device candidate(s) identity.

In a step 5.b, BS2 may check the UE-capability information, which is the same as step 5 of FIGS. 5a and 5b.

In a step 5.c, BS2 configures the virtual relay UE context and the conditions to apply that context by one or multiple relay UE(s) served by BS2. The same as the virtual UE context introduced with regard to FIGS. 5a and 5b, the configuration of the virtual relay UE context and the corresponding condition(s) allow UE1 to dynamically switch among the different relay mobile device candidate(s) served by BS2, without the need for BS2 to configure each selected relay mobile device of the relay mobile device candidate(s). In addition or in the alternative, by using the virtual relay UE context, UE1 can be handed over to BS2 via a relay UE served by BS2, though UE1 has not entered the coverage of BS2 yet. Optionally, BS2 may configure a second set of UE context and the corresponding second set of conditions, which may be used to configure UE1 for its direct Uu connection with BS2. The configuration may be sent to BS1, e.g. by using the HO request acknowledgement message.

The first set of the virtual relay UE context can be applied by a relay candidate served by BS2 to relay the traffic of UE1, if it can fulfill the configured conditions.

The second set of UE context can be applied by UE1 for a direct communication with BS2, once it enters the coverage of BS2. The conditions to apply this second set of UE context can be optionally configured.

In one example as the condition to apply the second set of UE context, BS2 may configure a high RSRP threshold for UE1's Uu interface to apply the second set of UE context. In this way, UE1 is served by the relay until its Uu interface with BS2 becomes quite good. Thus, UE1 applies the proposed dynamic relay switch scheme by using the virtual relay UE context until the configured Uu-RSRP threshold from the second set of condition(s) is met. This allows UE1 to exploit the good radio condition with the relay UE and to take advantage of the relay link continuously.

If the second set of UE context is not configured, the first set of the virtual relay UE context may also be applied by UE1 for a direct Uu connection with BS2, once UE1 enters the coverage of BS2.

In a sixth step, the virtual relay UE context and the associated conditions may be transmitted from BS1 to the relay candidates via UE1.

In another embodiment, they may also be transmitted directly by BS2 to the relay candidates. If BS2 configures the second set of UE context and/or the second set of conditions for UE1's direct Uu connection with BS2, the configuration may be transmitted from BS1 to UE1.

Between a seventh and an eleventh step, UE1 can perform the dynamic relay switch as introduced in FIGS. 5a and 5b, between one or more relay mobile device candidates.

In a twelfth step, UE1 itself may enter the coverage of BS2, and/or it meets the second set of conditions to apply the second set of UE context. In this case, UE1 may use the Uu interface to communicate with BS2 directly, as:

If the second set of UE context is configured, UE1 applies the second set of UE context to communicate directly with BS2.

Otherwise, UE1 may apply the configured virtual relay UE context to communicate with BS2.

In this case UE1 may further indicate to the BS2 that it is using the virtual relay UE context to communicate with the BS2. This in turn may trigger the BS2 and network to configure a new actual UE context to UE1 with/without releasing the virtual relay UE context.

Figure 7:
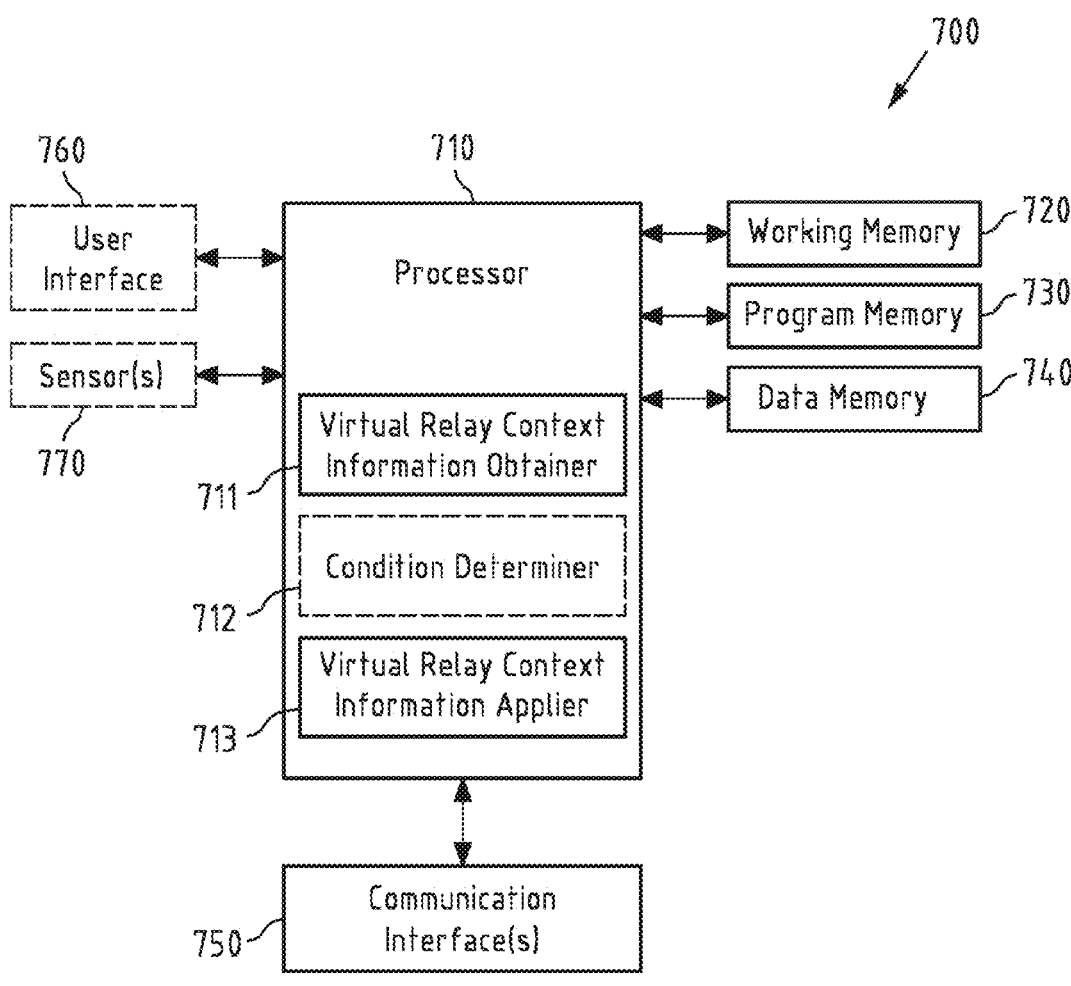
FIG. 7 a schematic block diagram of an apparatus configured to perform the method according to the first exemplary aspect.

FIG. 7 is a schematic block diagram of an apparatus 700 according to an exemplary aspect, which may for instance represent one or more of the mobile devices 130-2 to 130-7 of FIG. 1.

Apparatus 700 comprises a processor 710, working memory 720, program memory 730, data memory 740, communication interface(s) 750, an optional user interface 760 and an optional sensor(s) 770.

Apparatus 700 may for instance be configured to perform and/or control or comprise respective means (at least one of 710 to 770) for performing and/or controlling the method according to the first exemplary aspect. Apparatus 700 may as well constitute an apparatus comprising at least one processor (710) and at least one memory (720) including computer program code, the at least one memory and the computer program code configured to, with the at least one processor, cause an apparatus, e.g. apparatus 700 at least to perform and/or control the method according to the first exemplary aspect.

Processor 710 may for instance comprise a virtual relay context information obtainer 711 as a functional and/or structural unit. Virtual relay context information obtainer 711 may for instance be configured to obtain (e.g. receive) virtual relay context information (see step 201 of FIG. 2).

Processor 710 may for instance comprise an optional condition determiner 712 as a functional and/or structural unit. Condition determiner 712 may for instance be configured to determine whether or not at least one condition based on which the virtual relay context information is to be applied, is fulfilled (see step 202 of FIG. 2).

Processor 710 may for instance comprise a virtual relay context information applier 713 as a functional and/or structural unit. Virtual relay context information applier 713 may for instance be configured to apply virtual relay context information (see step 205 of FIG. 2).

Processor 710 may for instance further control the memories 720 to 740, the communication interface(s) 750, the optional user interface 760 and the optional sensor(s) 770.

Processor 710 may for instance execute computer program code stored in program memory 730, which may for instance represent a computer readable storage medium comprising program code that, when executed by processor 710, causes the processor 710 to perform the method according to the first exemplary aspect.

Processor 710 (and also any other processor mentioned in this specification) may be a processor of any suitable type. Processor 710 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 710 may for instance be an application processor that runs an operating system.

Program memory 730 may also be included into processor 710. This memory may for instance be fixedly connected to processor 710, or be at least partially removable from processor 710, for instance in the form of a memory card or stick. Program memory 730 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 730 may also comprise an operating system for processor 710. Program memory 730 may also comprise a firmware for apparatus 700.

Apparatus 700 comprises a working memory 720, for instance in the form of a volatile memory. It may for instance be a Random Access Memory (RAM) or Dynamic RAM (DRAM), to give but a few non-limiting examples. It may for instance be used by processor 710 when executing an operating system and/or computer program.

Data memory 740 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 740 may for instance store discovery information, virtual relay context information, or a combination thereof, to name but a few non-limiting examples.

Communication interface(s) 750 enable apparatus 700 to communicate with other entities, e.g. with one or more of the base stations, e.g. gNBs 120-1 or 120-2 of FIG. 1. The communication interface(s) 750 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 700 to communicate with other entities, for instance with other mobile devices 130-2 to 130-7 of FIG. 1.

User interface 760 is optional and may comprise a display for displaying information to a user and/or an input device (e.g. a keyboard, keypad, touchpad, mouse, etc.) for receiving information from a user.

Sensor(s) 770 are optional and may for instance comprise a barometric sensor, e.g. to gather pressure information.

Some or all of the components of the apparatus 700 may for instance be connected via a bus. Some or all of the components of the apparatus 700 may for instance be combined into one or more modules.

Figure 8:
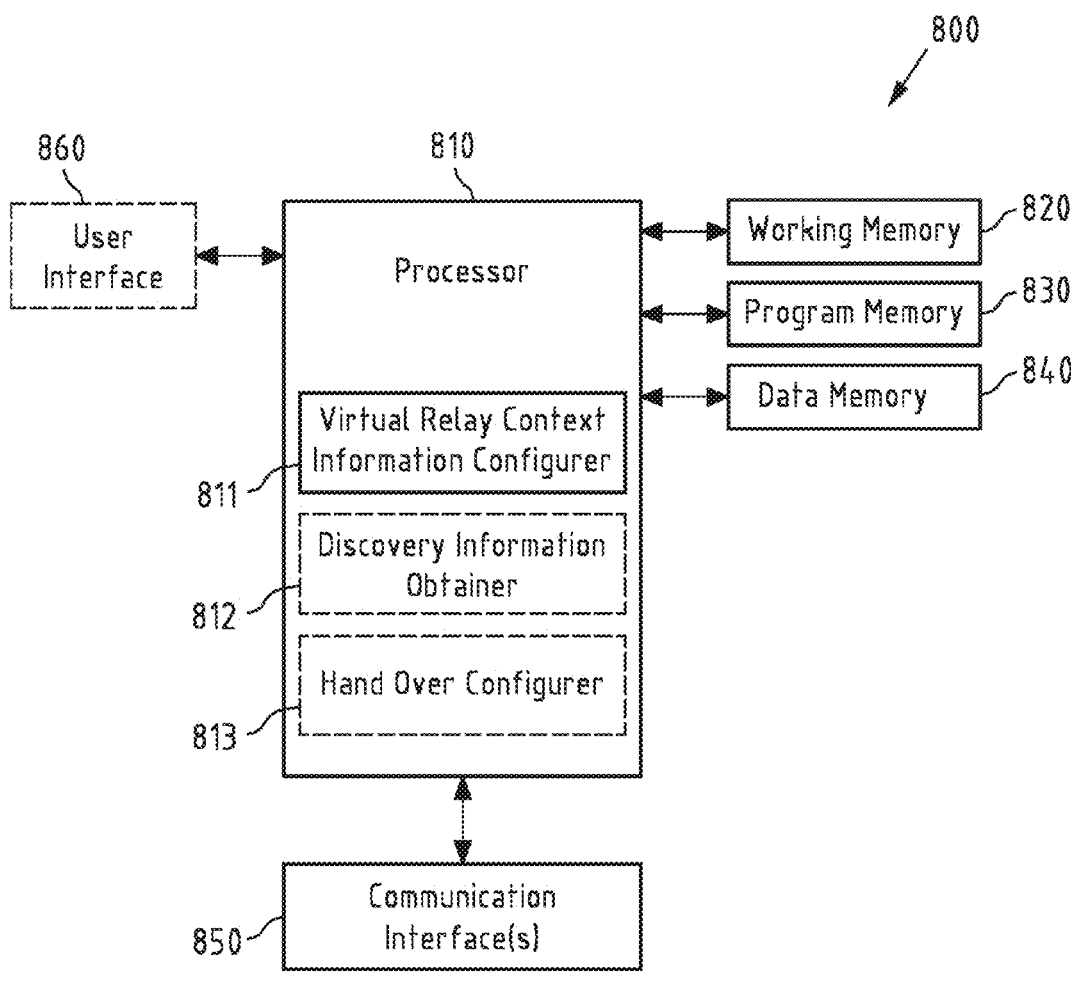
FIG. 8 a schematic block diagram of an apparatus configured to perform the method according to the second exemplary aspect.

FIG. 8 is a schematic block diagram of an apparatus 800 according to an exemplary aspect, which may for instance represent one or more of the base stations, e.g. gNBs 120-1 and 120-2 of FIG. 1.

Apparatus 800 comprises a processor 810, working memory 820, program memory 830, data memory 840, communication interface(s) 850, and an optional user interface 860.

Apparatus 800 may for instance be configured to perform and/or control or comprise respective means (at least one of 810 to 860) for performing and/or controlling the method according to the second exemplary aspect. Apparatus 800 may as well constitute an apparatus comprising at least one processor (810) and at least one memory (820) including computer program code, the at least one memory and the computer program code configured to, with the at least one processor, cause an apparatus, e.g. apparatus 800 at least to perform and/or control the method according to the second exemplary aspect.

Processor 810 may for instance comprise a virtual relay context information configurer 811 as a functional and/or structural unit. Virtual relay context information configurer 811 may for instance be configured to configure virtual relay context information (see step 302 of FIG. 3).

Processor 810 may for instance comprise an optional discovery information obtainer 812 as a functional and/or structural unit. Discovery information obtainer 812 may for instance be configured to obtain (e.g. receive) discovery information (see step 301 of FIG. 3).

Processor 810 may for instance comprise an optional hand over configurer 813 as a functional and/or structural unit. Hand over configure 813 may for instance be configured to configure virtual relay context information (see step 305 of FIG. 3).

Processor 810 may for instance further control the memories 820 to 840, the communication interface(s) 850, and the optional user interface 860.

Processor 810 may for instance execute computer program code stored in program memory 830, which may for instance represent a computer readable storage medium comprising program code that, when executed by processor 810, causes the processor 810 to perform the method according to the second exemplary aspect.

Processor 810 (and also any other processor mentioned in this specification) may be a processor of any suitable type. Processor 810 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 810 may for instance be an application processor that runs an operating system.

Program memory 830 may also be included into processor 810. This memory may for instance be fixedly connected to processor 810, or be at least partially removable from processor 810, for instance in the form of a memory card or stick. Program memory 830 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 830 may also comprise an operating system for processor 810. Program memory 830 may also comprise a firmware for apparatus 800.

Apparatus 800 comprises a working memory 820, for instance in the form of a volatile memory. It may for instance be a Random Access Memory (RAM) or Dynamic RAM (DRAM), to give but a few non-limiting examples. It may for instance be used by processor 810 when executing an operating system and/or computer program.

Data memory 840 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store discovery information, virtual relay context information, or a combination thereof, to name but a few non-limiting examples.

Communication interface(s) 850 enable apparatus 800 to communicate with other entities, e.g. at least one of the mobile devices 130-1 to 130-7 of FIG. 1, and/or with a respective base station, e.g. gNB 120-1 or 120-2 of FIG. 1. The communication interface(s) 850 may for instance comprise a wireless interface, e.g. a cellular radio communication interface and/or a WLAN interface) and/or wire-bound interface, e.g. an IP-based interface, for instance to communicate with entities via the Internet.

User interface 860 is optional and may comprise a display for displaying information to a user and/or an input device (e.g. a keyboard, keypad, touchpad, mouse, etc.) for receiving information from a user.

Some or all of the components of the apparatus 800 may for instance be connected via a bus. Some or all of the components of the apparatus 800 may for instance be combined into one or more modules.

Figure 9:
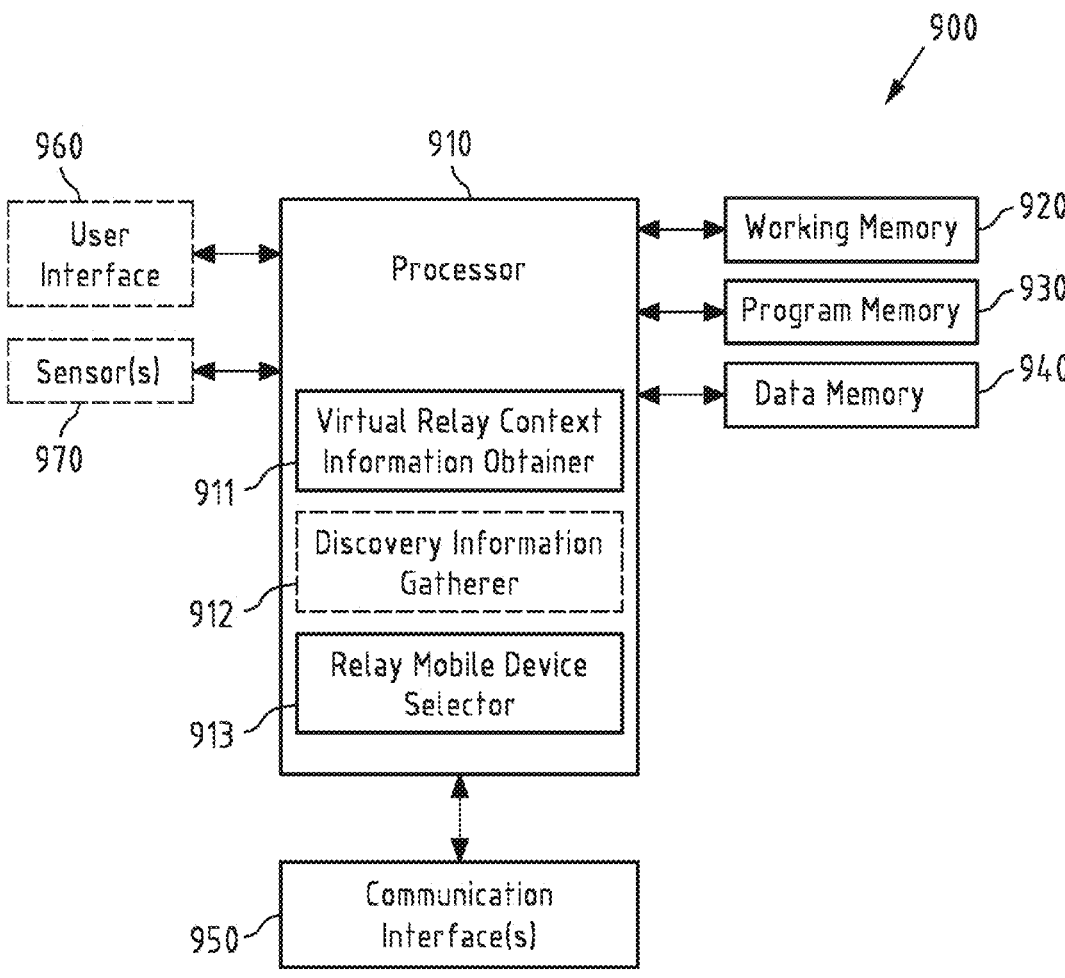
FIG. 9 a schematic block diagram of an apparatus configured to perform the method according to the third exemplary aspect.

FIG. 9 is a schematic block diagram of an apparatus 900 according to an exemplary aspect, which may for instance represent (e.g. remote) mobile device 130-1 of FIG. 1.

Apparatus 900 comprises a processor 910, working memory 920, program memory 930, data memory 940, communication interface(s) 950, an optional user interface 960 and an optional sensor(s) 970.

Apparatus 900 may for instance be configured to perform and/or control or comprise respective means (at least one of 910 to 970) for performing and/or controlling the method according to the third exemplary aspect. Apparatus 900 may as well constitute an apparatus comprising at least one processor (910) and at least one memory (920) including computer program code, the at least one memory and the computer program code configured to, with the at least one processor, cause an apparatus, e.g. apparatus 900 at least to perform and/or control the method according to the third exemplary aspect.

Processor 910 may for instance comprise a virtual relay context information obtainer 911 as a functional and/or structural unit. Virtual relay context information obtainer 911 may for instance be configured to obtain (e.g. receive) virtual relay context information (see step 402 of FIG. 4).

Processor 910 may for instance comprise an optional discovery information gatherer 912 as a functional and/or structural unit. Discovery information gatherer 912 may for instance be configured to gather discovery information to enable provision of the discovery information (see step 401 of FIG. 4).

Processor 910 may for instance comprise a relay mobile device selector 913 as a functional and/or structural unit. Relay mobile device selector may for instance be configured to select a relay mobile device among one or more relay mobile device candidates (see step 404 of FIG. 4).

Processor 910 may for instance further control the memories 920 to 940, the communication interface(s) 950, the optional user interface 960 and the optional sensor(s) 970.

Processor 910 may for instance execute computer program code stored in program memory 930, which may for instance represent a computer readable storage medium comprising program code that, when executed by processor 910, causes the processor 910 to perform the method according to the third exemplary aspect.

Processor 910 (and also any other processor mentioned in this specification) may be a processor of any suitable type. Processor 910 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 910 may for instance be an application processor that runs an operating system.

Program memory 930 may also be included into processor 910. This memory may for instance be fixedly connected to processor 910, or be at least partially removable from processor 910, for instance in the form of a memory card or stick. Program memory 930 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 930 may also comprise an operating system for processor 910. Program memory 930 may also comprise a firmware for apparatus 900.

Apparatus 900 comprises a working memory 920, for instance in the form of a volatile memory. It may for instance be a Random Access Memory (RAM) or Dynamic RAM (DRAM), to give but a few non-limiting examples. It may for instance be used by processor 910 when executing an operating system and/or computer program.

Data memory 940 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 940 may for instance store discovery information, virtual relay context information, or a combination thereof, to name but a few non-limiting examples.

Communication interface(s) 950 enable apparatus 900 to communicate with other entities, e.g. with one or more of the base stations, e.g. gNBs 120-1 or 120-2 of FIG. 1. The communication interface(s) 950 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 900 to communicate with other entities, for instance with other mobile devices 130-2 to 130-7 of FIG. 1.

User interface 960 is optional and may comprise a display for displaying information to a user and/or an input device (e.g. a keyboard, keypad, touchpad, mouse, etc.) for receiving information from a user.

Sensor(s) 970 are optional and may for instance comprise a barometric sensor, e.g. to gather pressure information.

Some or all of the components of the apparatus 900 may for instance be connected via a bus. Some or all of the components of the apparatus 900 may for instance be combined into one or more modules.

The following embodiments shall also be considered to be disclosed:

Embodiment 1

A method performed and/or controlled by at least one apparatus, the method comprising:
obtaining virtual relay context information enabling the apparatus to serve at least one remote mobile device as a relay mobile device to relay traffic between the at least one remote mobile device and a base station of a mobile communication network; and
applying the virtual relay context information to be configured as the relay mobile device for the at least one remote mobile device in case at least one condition of one or more conditions is fulfilled and/or in case of an activation indication is obtained.

Embodiment 2

The method according to embodiment 1, wherein the virtual relay context information is obtained prior to the at least one condition is fulfilled and/or the activation indication is obtained.

Embodiment 3

The method according to embodiment 1 or embodiment 2, the method further comprising:
determining whether or not the at least one condition of the one or more conditions is fulfilled, wherein the one or more conditions enable the apparatus to serve as a relay mobile device between the at least one remote mobile device and the base station, wherein the virtual relay context information is applied based, at least in part, on the determining.

Embodiment 4

The method according to any of the preceding embodiments, wherein the virtual relay context information is obtained by the apparatus and at least one other apparatus to serve the at least one remote mobile device as a respective relay mobile device to relay traffic between the at least one remote mobile device and a base station of a mobile communication network.

Embodiment 5

The method according to any of the preceding embodiments, further comprising:
providing at least one condition indication indicative of at least one condition of the one or more conditions is fulfilled.

Embodiment 6

The method according to any of the preceding embodiments, further comprising:
obtaining the activation indication indicating to apply the virtual relay context information from the at least one remote mobile device, wherein the virtual relay context information is applied based, at least in part, on the obtained activation indication of the at least one remote mobile device.

Embodiment 7

The method according to any of the preceding embodiments, wherein the virtual relay context information comprises at least part of the one or more conditions for the one or more relay mobile device candidates.

Embodiment 8

The method according to any of the preceding embodiments, wherein the virtual relay context information comprises at least one of the following:
an identifier corresponding to the virtual relay context information;
scheduling configuration;
configured grant configuration;
one or more bearer configurations;
channel configuration;
NAS layer configuration;
RRC layer configuration;
MAC layer configuration; and
PHY layer configuration.

Embodiment 9

The method according to any of the preceding embodiments, further comprising:
providing a condition change indication indicative of a change of the at least one condition disabling/enabling the apparatus to apply the virtual relay context information and serve as a relay mobile device between the at least one remote mobile device and the base station.

Embodiment 10

The method according to any of the preceding embodiments, the virtual relay context information is obtained from the at least one remote mobile device and/or the mobile communication network.

Embodiment 11

A method, performed by at least one apparatus, comprising:

configuring virtual relay context information enabling one or more relay mobile device candidates to serve at least one remote mobile device as a relay mobile device to relay traffic between the at least one remote mobile device and the apparatus;
providing the virtual relay context information to the one or more relay mobile device candidates prior to a respective relay mobile candidate is selected as a relay mobile device for the at least one remote mobile device.

Embodiment 12

The method according to embodiment 11, further comprising:
communicating with the at least one remote mobile device via the relay mobile device by using the provided virtual relay context information.

Embodiment 13

The method according to embodiment 11 or embodiment 12, further comprising:
obtaining discovery information indicative of a presence of one or more relay mobile device candidates, wherein the virtual relay context information is configured based, at least in part, on the discovery information.

Embodiment 14

The method according embodiment 13, wherein configuring the virtual relay context information further comprises:
determining the one or more relay mobile device candidates; and
configuring the virtual relay context information based on a respective capability of the determined relay mobile device candidates.

Embodiment 15

The method according embodiment 13 or embodiment 14, the method further comprising:
determining one or more capabilities of the one or more relay mobile device candidates, wherein the virtual relay context information is configured based, at least in part, on the determined one or more capabilities of the one or more relay mobile device candidates.

Embodiment 16

The method according to any of the embodiments 13 to 15, wherein the respective capability of the one or more relay mobile device candidates is comprised by the discovery information.

Embodiment 17

The method according to any of the embodiments 11 to 16, wherein the virtual relay context information is provided to the one or more relay mobile device candidates and/or to the at least one remote mobile device.

Embodiment 18

The method according to any of the embodiments 11 to 17, wherein the virtual relay context information further comprises at least part of one or more conditions for the one or more relay mobile device candidates enabling a respective relay mobile device to apply the virtual relay context information to relay the traffic of the remote mobile device.

Embodiment 19

The method according to any of the embodiments 11 to 18, wherein the virtual relay context information further comprises at least one of the following:
an identifier corresponding to the virtual relay context information;
scheduling configuration;
configured grant configuration;
one or more bearer configurations;
channel configuration;
NAS layer configuration;
RRC layer configuration;
MAC layer configuration; and
PHY layer configuration.

Embodiment 20

The method according to any of the embodiments 11 to 19, further comprising:
configuring a hand over of the respective remote mobile device via its relay mobile device to a target base station.

Embodiment 21

The method according to any of the embodiments 11 to 20, further comprising:
providing the virtual relay context information at least via a second base station and a respective relay mobile device that is served by the second base station.

Embodiment 22

A method, performed by at least one apparatus, comprising:
providing discovery information at least indicative of a presence of one or more relay mobile device candidates; and
selecting a respective relay mobile device from the one or more relay mobile device candidates configured with virtual relay context information for relaying traffic for the apparatus; and
utilizing the selected relay mobile device using the virtual relay context information for communicating with a base station of a mobile communication network.

Embodiment 23

The method according to embodiment 22, further comprising:
providing an activation indication indicating to apply a virtual relay context information to the selected relay mobile device.

Embodiment 24

The method according to embodiment 22 or embodiment 23, wherein the virtual relay context information comprises at least one of the following:
an identifier corresponding to the virtual relay context information;
scheduling configuration;

configured grant configuration;
one or more bearer configurations;
channel configuration;
NAS layer configuration;
RRC layer configuration;
MAC layer configuration; and
PHY layer configuration.

Embodiment 25

The method according to any of the embodiments 22 to 24, further comprising:
obtaining at least one condition indication indicative of at least one condition of one or more conditions being fulfilled by at least one relay mobile device candidate; and
providing an activation indication indicating to apply the virtual relay context information based, at least in part, on the at least one condition indication.

Embodiment 26

The method according to any of the embodiments 22 to 25, wherein the virtual relay context information are configured/obtained from a target base station to which a hand over is to be performed.

Embodiment 27

An apparatus configured to perform and/or control or comprising respective means for performing and/or controlling the method of any of the embodiments 1 to 10.

Embodiment 28

An apparatus comprising at least one processor and at least one memory including computer program code, the at least one memory and the computer program code configured to, with the at least one processor, cause an apparatus at least to perform and/or control the method of any of the embodiments 1 to 10.

Embodiment 29

An apparatus configured to perform and/or control or comprising respective means for performing and/or controlling the method of any of the embodiments 11 to 21.

Embodiment 30

An apparatus comprising at least one processor and at least one memory including computer program code, the at least one memory and the computer program code configured to, with the at least one processor, cause an apparatus at least to perform and/or control the method of any of the embodiments 11 to 21.

Embodiment 31

An apparatus configured to perform and/or control or comprising respective means for performing and/or controlling the method of any of the embodiments 22 to 26.

Embodiment 32

An apparatus comprising at least one processor and at least one memory including computer program code, the at least one memory and the computer program code config-
ured to, with the at least one processor, cause an apparatus
at least to perform and/or control the method of any of the
embodiments 22 to 26.

Embodiment 33

A tangible computer-readable medium storing computer
program code, the computer program code when executed
by a processor causing an apparatus to perform and/or
control:
  obtaining virtual relay context information enabling the
    apparatus to serve at least one remote mobile device as
    a relay mobile device to relay traffic between the at
    least one remote mobile device and a base station of a
    mobile communication network; and
  applying the virtual relay context information to be con-
    figured as the relay mobile device for the at least one
    remote mobile device in case at least one condition of
    one or more conditions is fulfilled and/or in case of an
    activation indication is obtained.

Embodiment 34

A tangible computer-readable medium storing computer
program code, the computer program code when executed
by a processor causing an apparatus to perform and/or
control:
  configuring virtual relay context information enabling one
    or more relay mobile device candidates to serve at least
    one remote mobile device as a relay mobile device to
    relay traffic between the at least one remote mobile
    device and the apparatus;
  providing the virtual relay context information to the one
    or more relay mobile device candidates prior to a
    respective relay mobile candidate is selected as a relay
    mobile device for the at least one remote mobile device.

Embodiment 35

A tangible computer-readable medium storing computer
program code, the computer program code when executed
by a processor causing an apparatus to perform and/or
control:
  providing discovery information at least indicative of a
    presence of one or more relay mobile device candi-
    dates; and
  selecting a respective relay mobile device from the one or
    more relay mobile device candidates configured with
    virtual relay context information for relaying traffic for
    the apparatus; and
  utilizing the selected relay mobile device using the virtual
    relay context information for communicating with a
    base station of a mobile communication network.

Embodiment 36

A system comprising:
at least one first apparatus according to embodiment 27 or
  embodiment 28;
at least one second apparatus according to embodiment 29
  or embodiment 30; and
at least one third apparatus according to embodiment 31
  or embodiment 32.
In the present specification, any presented connection in
the described embodiments is to be understood in a way that
the involved components are operationally coupled. Thus, the connections can be direct or indirect with any number or
combination of intervening elements, and there may be
merely a functional relationship between the components.
Moreover, any of the methods, processes and actions
described or illustrated herein may be implemented using
executable instructions in a general-purpose or special-
purpose processor and stored on a computer-readable stor-
age medium (e.g., disk, memory, or the like) to be executed
by such a processor. References to a 'computer-readable
storage medium' should be understood to encompass spe-
cialized circuits such as FPGAs, ASICs, signal processing
devices, and other devices.
The expression "A and/or B" is considered to comprise
any one of the following three scenarios: (i) A, (ii) B, (iii) A
and B. Furthermore, the article "a" is not to be understood
as "one", i.e. use of the expression "an element" does not
preclude that also further elements are present. The term
"comprising" is to be understood in an open sense, i.e. in a
way that an object that "comprises an element A" may also
comprise further elements in addition to element A.
It will be understood that all presented embodiments are
only exemplary, and that any feature presented for a par-
ticular example embodiment may be used with any aspect on
its own or in combination with any feature presented for the
same or another particular example embodiment and/or in
combination with any other feature not mentioned. In par-
ticular, the example embodiments presented in this specifi-
cation shall also be understood to be disclosed in all possible
combinations with each other, as far as it is technically
reasonable and the example embodiments are not alterna-
tives with respect to each other. It will further be understood
that any feature presented for an example embodiment in a
particular category (method/apparatus/computer program/
system) may also be used in a corresponding manner in an
example embodiment of any other category. It should also be
understood that presence of a feature in the presented
example embodiments shall not necessarily mean that this
feature forms an essential feature and cannot be omitted or
substituted.
The statement of a feature comprises at least one of the
subsequently enumerated features is not mandatory in the
way that the feature comprises all subsequently enumerated
features, or at least one feature of the plurality of the
subsequently enumerated features. Also, a selection of the
enumerated features in any combination or a selection of
only one of the enumerated features is possible. The specific
combination of all subsequently enumerated features may as
well be considered. Also, a plurality of only one of the
enumerated features may be possible.
The sequence of all method steps presented above is not
mandatory, also alternative sequences may be possible.
Nevertheless, the specific sequence of method steps exem-
plarily shown in the figures shall be considered as one
possible sequence of method steps for the respective
embodiment described by the respective figure.
The subject-matter has been described above by means of
example embodiments. It should be noted that there are
alternative ways and variations which are obvious to a
skilled person in the art and can be implemented without
deviating from the scope of the appended claims.

What is claimed is:
1. An apparatus comprising at least one processor and at
least one memory including computer program code, the at
least one memory and the computer program code config-
ured to, with the at least one processor, cause the apparatus
to at least perform:

obtaining virtual relay context information enabling the apparatus to serve at least one remote mobile device as a relay mobile device to relay traffic between the at least one remote mobile device and a base station of a mobile communication network, wherein the virtual relay context information further comprises the following:

an identifier corresponding to the virtual relay context information;

scheduling configuration;

configured grant configuration;

one or more bearer configurations;

channel configuration;

Non Access Stratum (NAS) layer configuration;

Radio Resource Control (RRC) layer configuration;

Medium Access Control (MAC) layer configuration; and

Physical (PHY) layer configuration; and based on a condition specified by the virtual relay context information being locally determined by the apparatus to be fulfilled and when an activation indication is received from the at least one remote mobile device, applying the virtual relay context information to be configured as the relay mobile device for the at least one remote mobile device, wherein the virtual relay context information is obtained prior to the condition being fulfilled and the activation indication being received, and wherein the virtual relay context information is applied without requiring further configuration signaling from the mobile communication network.

2. The apparatus according to claim 1, the at least one memory and the computer program code configured to, with the at least one processor, cause the apparatus further to perform:

determining whether or not the condition of a plurality of conditions is fulfilled, wherein the plurality of conditions enable the apparatus to serve as a relay mobile device between the at least one remote mobile device and the base station.

3. The apparatus according to claim 2, wherein the virtual relay context information is obtained by the apparatus and at least one other apparatus to serve the at least one remote mobile device as a respective relay mobile device to relay traffic between the at least one remote mobile device and a base station of a mobile communication network.

4. The apparatus according to claim 3, the at least one memory and the computer program code configured to, with the at least one processor, cause the apparatus further to perform:

obtaining the activation indication indicating to apply the virtual relay context information from the at least one remote mobile device, wherein the virtual relay context information is applied based, at least in part, on the obtained activation indication of the at least one remote mobile device.

5. The apparatus according to claim 4 wherein the virtual relay context information comprises at least part of the one or more conditions for the one or more relay mobile device candidates.

6. The apparatus according to claim 1, the at least one memory and the computer program code configured to, with the at least one processor, cause the apparatus further to perform:

providing a condition change indication indicative of a change of the at least one condition disabling/enabling the apparatus to apply the virtual relay context information and serve as a relay mobile device between the at least one remote mobile device and the base station.

7. The apparatus according to claim 1, wherein the virtual relay context information is obtained from the at least one remote mobile device and/or the mobile communication network.

8. A method comprising:

obtaining, by an apparatus, virtual relay context information enabling to serve at least one remote mobile device as a relay mobile device to relay traffic between the at least one remote mobile device and a base station of a mobile communication network, wherein the virtual relay context information further comprises the following:

an identifier corresponding to the virtual relay context information;

scheduling configuration;

configured grant configuration;

one or more bearer configurations;

channel configuration;

Non Access Stratum (NAS) layer configuration;

Radio Resource Control (RRC) layer configuration;

Medium Access Control (MAC) layer configuration; and

Physical (PHY) layer configuration; and based on a condition specified by the virtual relay context information being locally determined by the apparatus to be fulfilled and when an activation indication is received from the at least one remote mobile device, applying, by the apparatus, the virtual relay context information to be configured as the relay mobile device for the at least one remote mobile device, wherein the virtual relay context information is obtained prior to the condition being fulfilled and the activation indication being received, and wherein the virtual relay context information is applied without requiring further configuration signaling from the mobile communication network.

* * * * *